United States Patent [19]
Shapiro et al.

[11] Patent Number: 6,044,306
[45] Date of Patent: Mar. 28, 2000

[54] METHODS AND APPARATUS FOR SHAPING MOVING GEOMETRIC SHAPES

[75] Inventors: Vadim Shapiro, 2025 Chadbourne Ave., Madison, Wis. 53705; Horea T. Ilies, Madison, Wis.

[73] Assignee: Vadim Shapiro, Madison, Wis.

[21] Appl. No.: 08/949,379

[22] Filed: Oct. 14, 1997

[51] Int. Cl.[7] .................................................. G06F 19/00
[52] U.S. Cl. .............................. 700/90; 700/97; 700/103; 395/500.01; 345/427; 345/429
[58] Field of Search ..................... 395/500.01, 500.23, 395/90; 345/427, 429, 419, 420, 424; 700/90, 61, 97, 103, 118, 178, 182, 255, 98

[56] References Cited

U.S. PATENT DOCUMENTS

| | | | |
|---|---|---|---|
| 4,785,399 | 11/1988 | Evans et al. | 364/300 |
| 4,888,707 | 12/1989 | Shimada | 364/513 |
| 5,044,127 | 9/1991 | Ryan | 51/287 |
| 5,116,173 | 5/1992 | Goldrich | 409/13 |
| 5,122,966 | 6/1992 | Jansen et al. | 364/474.2 |
| 5,159,512 | 10/1992 | Evans et al. | 395/119 |
| 5,343,385 | 8/1994 | Joskowicz et al. | 364/167.01 |
| 5,351,196 | 9/1994 | Sowar et al. | 364/474.24 |
| 5,542,036 | 7/1996 | Schroeder et al. | 395/124 |

OTHER PUBLICATIONS

Blackmore and M.C. Leu. A differential equation approach to swept volumes. *IEEE*, Proceedings of the 2nd International Conference on Computer Integrated Manufacturing, pp. 143–149, 1990.

Menon, R. J. Marisa, and J. Zagajac. More powerful solid modeling through ray representations. *IEEE Computer Graphics and Applications*, 14(3), May 1994.

Jai P. Menon and Dean M. Robinson. Advanced NC verification via massively parallel raycasting. *Manufacturing Review*, 6(2):141–154, 1993.

Requicha. Representations for rigid solids: Theory, methods and systems. *Computing Surveys*, 12(4):437–463, 1980.

John M. Snyder and James T. Kajiya. Generative modeling: A symbolic system for geometric modeling. In Computer Graphics (SIGGRAPH '92 Proceedings), vol. 26, pp. 369–378, 1992.

Sourin and A. Pasko. Function representation for sweeping by a moving solid. In Third International Symposium on Solid Modeling and Applications, pp. 383–392, May 1995.

Wang and K.K. Wang. Geometric modeling for swept volume of moving solids. *IEEE Computer Graphics Applications*, pp. 8–17, Dec. 1987.

Chen and C. H. Hoffmann. Towards feature attachment. *Technical Report CSD–TR–94–010*, Department of Computer Science, Purdue University, West Lafayette, IN, Feb. 1994, pp 1–18.

J.K Davidson and K.H. Hunt. Robot workspace of a tool plane: Part 1—a ruled surface and other geometry. *Journal of Mechanisms, Transmissions and Automation in Design*, 109:50–60, 1987.

(List continued on next page.)

*Primary Examiner*—Paul P. Gordon
*Assistant Examiner*—Steven R. Garland
*Attorney, Agent, or Firm*—Craig A. Fieschko, Esq.; DeWitt Ross & Stevens, S.C.

[57] ABSTRACT

Disclosed are methods for determining the largest subset of points that remains within a set of points S (i.e., shape S) when S is subjected to a motion M. These methods, which are generally designated herein as unsweep (or formalistically unsweep(S,M)), can be implemented (preferably by computer) for a variety of practical purposes, for example mechanical parts design. In this instance, simply by knowing the motion to be experienced by a part and the envelope wherein the part must fit during motion, unsweep can define the largest part that fits within the envelope according to the given motion. While direct part shape output is obtained, no part shape needs to be proposed beforehand, and thus the design process is no longer an iterative process of proposing shapes and correcting them in the case of interference. Further, unsweep is related to the known sweep function and can be used to obtain sweeps as well as unsweeps.

28 Claims, 19 Drawing Sheets

OTHER PUBLICATIONS

Evans, R.C. Koppelman and V.T. Rajan. Shaping geometric objects by cumulative translational sweeps. *IBM J. Res. Develop.*, 31(3) :343–360, 1987.

D. Foley, A. van Dam, S. K. Feiner, and J. F. Hughes. *Computer Graphics: Principles and Practice.* Addison–Wesley, 1990, pp 533–562.

A. Ganter. *Dynamic Collision Detection Using Kinematics and Solid Modeling Techniques.* PhD thesis, University of Wisconsin–Madison, 1985.

Ilies and V. Shapiro. An approach to systematic part design. In Proceedings of the 5th IFIP WG5.2 Workshop on Geometric Modeling in CAD, pp. 383–392, May 1996.

Kuratowski and A. Mostowski. Set Theory. North Holland, Amsterdam/New York/Oxford, 1976. Studies in Logic and Foundations of Mathematics, vol. 86, pp 1–45, 106–117.

Jean–Claude Latombe. *Robot Motion Planning.* Kluwer Academic Publishers, Boston / Dordrecht/ London, 1991, pp. 58–104.

Martin, R.R. and P.C. Stephenson. Putting objects into boxes, *Computer Aided Design,* 20(9):506–514, 1988.

Martin, R.R. and P.C. Stephenson. Sweeping of three–dimensional objects, *Computer Aided Design,* 22 (4):223–233, 1990.

Menon and H. B. Voelcker. Set theoretic properties of ray representations and Minkowski operations on solids. *Technical Report CPA91–9, Cornell Programmable Automation,* Cornell University, Ithaca, NY, Jan. 1992.

Menon, J.P. and Robinson, D.M., Advanced NC Verification via Massively Parallel Raycasting, *Manufacturing Review,* 6(2):141–154, Jun. 1993.

Minon, J.P., Marisa, R.J. and Zagajac, J., More Powerful Solid Modeling through Ray Representations, *IEEE Computer Graphics and Applications,* pp. 22–35, 1994.

Requicha, A.A.G., Representations for Rigid Solids: Theory, Methods, and Systems, *Computing Surveys,* 12 (4):437–464, Dec. 1980.

Jean Serra. *Image Analysis and Mathematical Morphology.* Academic Press, London, 1982. vol. 1, pp. 34–56.

Snyder, J.M. and Kajiya, J.T., Generative Modeling: A symbolic System for Geometric Modeling, *Computer Graphics,* 26(2):369–378, Jul. 1992.

Sourin, A. and Pasko, A., Function Representation for Sweeping by a Moving Solid, *Solid Modeling '95,* Salt Lake City, Utah USA, pp. 383–391, 1995.

Spyridi. *Automatic Generation of High Level Inspection Plans for Coordinate Measuring Machine.* PhD thesis, University of Southern California, 1994.

B. Tilove. Set membership classification: A unified approach to geometric intersection problems. *IEEE Transactions on Computer,* C–29(10):874–883, Oct. 1980.

L. Vossler. Sweep–to–CSG conversion using pattern recognition techniques. *IEEE Computer Graphics and Applications,* 5(8):61–68, 1985.

Wang, W.P. and Wang, K.K., Geometric Modeling for Swept Motion of Moving Soldis, *IEEE Computer Graphics and Applications,* pp. 8–17, 1986.

K.C. Hui Solid Modelling with Sweep CSG Representation CSG 94 set Theoretic Solid Modeling, Techniques and Applications pp. 119–131, 1994.

Trajectory of point x generated by M(t) as seen from the fixed coordinate system $F_W$. Point y remains fixed in $F_W$.

Trajectory of point x generated by M(t), as seen from the moving coordinate system $F_S$, can be observed by watching the 'trace' of point y fixed in $F_W$.

Part S is moving inside a containing set E according to M.

sweep(S,M) - E = ∅ indicates interference between S and E at some time.

Moving set F is observed from the stationary set E

Stationary set E is observed from the moving set F

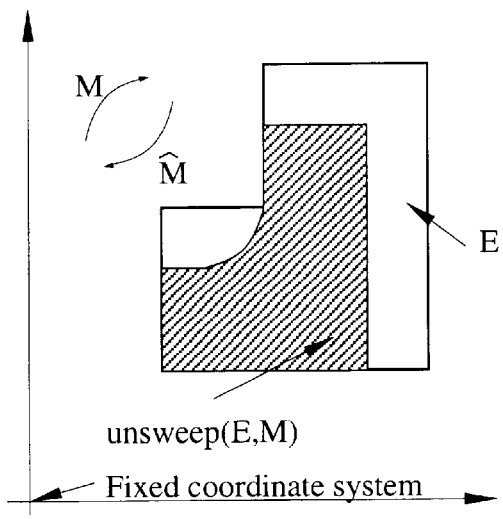

Points are moving in pure translation according to $\widehat{M}$ with respect to the fixed coordinate system. Set E is stationary.

FIG. 9

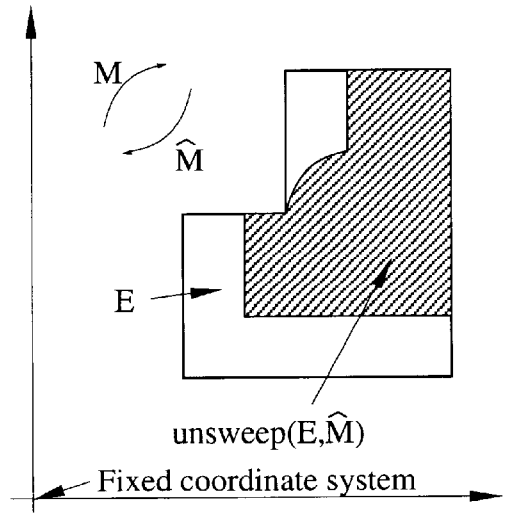

Set E is moving in pure translation with respect to the fixed coordinate system

FIG. 10

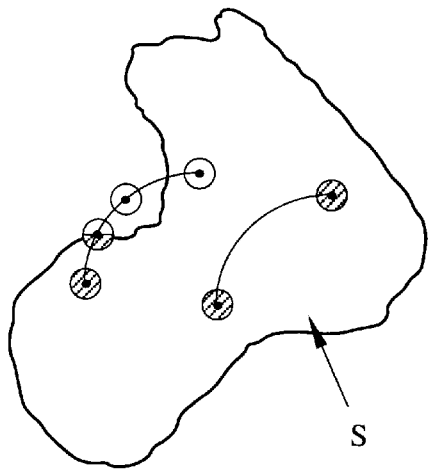

If the trajectory of a point remains inside the set S, its neighborhood remains full. If the trajectory crosses the boundary, the neighborhood becomes empty.

FIG. 11

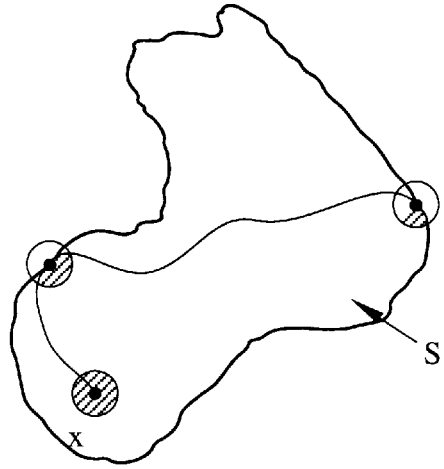

Neighborhood of point x gets trimmed every time its trajectory hits the boundary of S.

FIG. 12

If S is a closed set, the Point Membership Classification test reduces to the classification of a curve T(x) against the representation for set S Structure of the current invention Detailed Implementation using Cell Decomposition Computing sweep(S,M) via unsweep Boundary evaluation of the unsweep Using finite intersection to compute unsweep Alternative Embodiments of the Invention unsweep(E,M) is the largest part
that fits inside E under M.

Steps involved in determining the modifications of a part S that does not fit inside an envelope E. The packaging requirements on S is that it has to fit inside E at all times during the motion M.

Cam Design

Steps involved in the Geometric Design of Cams

Steps involved in the Geometric Design of Gears

Shape synthesis using unsweep operation: unsweep of the prismatic solid S by 360 degrees rotation.

METHODS AND APPARATUS FOR SHAPING MOVING GEOMETRIC SHAPES

GOVERNMENT LICENSE RIGHTS

The U.S. Government has a paid-up license in this invention and the right in limited circumstances to require the patent owner to license others on reasonable terms as provided for by the terms of NSF Grant No. DMI 9502728 awarded by the National Science Foundation.

FIELD OF THE INVENTION

This disclosure concerns an invention relating generally to modeling of geometric shapes, and more specifically to modeling moving geometric shapes based on their motion relative to other geometric shapes present in the same space.

BACKGROUND OF THE INVENTION

The precise modeling of moving geometric shapes has a high degree of importance in numerous applications, e.g., CAD/CAM (computer-aided design and manufacturing) applications and computer graphics, visualization, and imaging applications. In general, modeling of moving geometric shapes is performed by an operation commonly known as sweep (or sweeping). If a shape is defined by a set of points S, and the set S moves on path M, the sweep of S along M is the set of points swept (or occupied) by S at some time during the motion. To explain sweep mathematically, it is first valuable to review several background concepts of spatial modeling.

Consider a shape (a set of points) S with its own coordinate system $F_s$ moving in a d-dimensional Euclidean space W with respect to some global fixed coordinate system $F_w$. Following the notation assigned by reference 10 of the Bibliography at the end of this disclosure, the motion of the shape S can be expressed as M(t), $t \in [0,1]$, a one-parameter set of transformations in the higher-dimensional configuration space C. For the purposes of this invention, the concepts of "transformation" and "motion" are interchangeable and are commonly represented by matrices. Additionally, this discussion will refer to rigid body motions for illustration purposes but, except when noted, all discussion and results apply to general non-singular affine transformations in $E^d$.

At every instant t=a, the original point x of S moves to a new location that is determined by the transformation M(a). Superscript notation will be used to define the transformed points (and set of points) as $$x^{M(a)} = M(a) \cdot x, \quad S^{M(a)} = M(a) S \qquad (1)$$

The transformation $q \in M(t)$ for some instantaneous value t determines the position and orientation of $F_s$ with respect to $F_w$ at that instant and therefore determines the coordinates of every point $x^q$ of the moving set S with respect to $F_w$. By definition, a point $x \in S$ is located at $x^{M(0)}$ with respect to $F_w$.

In the special (but common) case of rigid body motion in three-dimensional Euclidean space, each transformation M(a) specifies rotation and translation of S at time a with respect to $F_w$. Rigid body motion in a d-dimensional space is determined by $d(d+1)/2$ independent degrees of freedom as a path in the configuration space C. The mathematical properties of such a configuration space are well understood (see, e.g., reference 10 of the Bibliography at the end of this disclosure).

For a range of values of t, M(t) is a subset of the configuration space C. For brevity, the set M(t), $t \in [0,1]$ may simply be denoted as M. A motion M specifies how the moving coordinate system $F_s$ moves with respect to the fixed coordinate system $F_w$. Every point x of set S moves with respect to $F_w$ according to M, as illustrated in FIG. 1. Two-dimensional examples are used for clarity, but the same arguments hold in any d-dimensional space. As t goes from 0 to a, the moving point $x^{M(t)}$ sweeps, with respect to the fixed frame $F_w$, a set of points $T_x$ called the trajectory of x. The trajectory $T_x$ is defined as $$T_x = M(t)x = \bigcup_{q \in M} x^q \qquad (2)$$

Each instantaneous transformation M(a) in equation (1) has a unique inverse $\hat{M}(a)$ such that $x = \hat{M}(a)[M(a)x]$. Given a transformation M(t) for a range of values of $t \in [0,1]$, we will call transformation $\hat{M}(t)$ inverted if it is the inverse of M(t) for every instance of t.

Consider the point y as being the copy of point $x \in S$ in $F_w$ at the initial configuration. Point y is fixed in $F_w$ and does not move with set S, but rather it moves relative to S. To an observer placed at the origin of $F_s$ the moving point $x \in S$ will appear to be fixed while the fixed coordinate system $F_w$, and the point y fixed in $F_w$, will appear to be moving according to the inverted motion $\hat{M}(t)$. In other words, the moving observer will see the inverted trajectory $$\hat{T}_x = \hat{M}(t)x = \bigcup_{q \in \hat{M}} x^q \qquad (3)$$

This is illustrated in FIG. 2. Note that the point y is introduced only to illustrate the difference between what the observer sees from the two coordinate systems $F_w$ and $F_s$. To paraphrase, the trajectory of the moving point x, observed from $F_w$, is generated by the motion M, while the trajectory of the same point x, observed from $F_s$, is generated by the inverted motion $\hat{M}$. Intuitively, $T_x$ represents the trace left by moving point x as seen from $F_w$, while $\hat{T}_x$ is the trace of x as seen from $F_s$. Therefore, while observed from the fixed coordinate system $F_w$, the points x of S are moving according to M, and while observed from the moving coordinate system $F_s$, the "world" appears to be moving according to $\hat{M}$. For example, when M is a pure translation, the two trajectories $T_x$ and $\hat{T}_x$ are simply reflections of one another with respect to the origin, i.e., $T_x = -\hat{T}_x$ (see, e.g., reference 17).

To introduce the concept of relative motion, consider a moving set E that moves according to the absolute motion $M_E$, and denote the absolute motion of set S by $M_S$. In the general case, two objects always move relative to each other. Sometimes one of the objects is at rest with respect to $F_w$, which is only a particular case wherein the relative motion between the two objects happens to be identical with the absolute motion. One can express the relative motion in any coordinate system that can be defined in the space of the objects, but it is usually expressed in one of the coordinate systems attached to each of the two objects and which moves together with the objects. Since sets S and E move relative to each other, their relative motion can be expressed in a coordinate system attached to S by $$M_{S/E} = M_E^{-1} M_S \qquad (4)$$

and, consequently, in a coordinate system $F_E$ attached to E by $$M_{E/S} = M_S^{-1} M_E \qquad (5)$$

Equation (4) expresses points of $F_s$ in $F_E$, while equation (5) expresses points of $F_E$ in $F_s$.

It is then relevant to review how relative motions and trajectories can be represented in projective space. General affine transformations in $E^d$ can be represented as linear transformations in projective space using homogeneous coordinates and (d+1) ×(d+1) matrices (see, e.g., reference 17). Thus, if motion M(t) is given by a matrix A(t), then the inverted motion $\hat{M}$ (t) is given by the inverse of this matrix $A^{-1}(t)$. In the case of a rigid body motion in $E^3$, this may be depicted as $$A(t) = \begin{bmatrix} \Theta(t) & \tau(t) \\ 0\ 0 & 0\ 1 \end{bmatrix} \qquad (6)$$

and $$A^{-1}(t) = \begin{bmatrix} \Theta(t) & -\Theta^T(t)\tau(t) \\ 0\ 0 & 0\ 1 \end{bmatrix} \qquad (7)$$

where $\theta(t)$ and $\tau(t)$ respectively represent the rotational and translational components of the motion M(t). In the case of pure rotation, $\tau(t)=0$ and $A^{-1}(t)$ is obtained from A(t) by replacing the orthonormal sub-matrix $\theta(t)$ with its transpose $\theta^T(t)$. When M(t) is a pure translation, $\theta(t)$ is the identity, and $A^{-1}(t)$ is obtained from A(t) by replacing $\tau(t)$ with its reflection $-\tau(t)$.

If a point x is represented by a vector $\bar{v}$, and a motion M(t) is represented by a matrix A(t), the trajectory $T_x$ can be written in parametric form simply as $A(t)\bar{v}$.

The parametric form of the curve $T_x$ is suitable for computing the intersection of $T_x$ with the boundary of a given set (typically solid) S, as needed for the PMC procedure developed below. In the general case, this representation of $T_x$ would use trigonometric functions, and it may be useful to re-parameterize $T_x$ in a computationally more convenient form.

With this background in mind, sweep may be formally expressed as $$sweep(S, M) = \bigcup_{q \in M} S^q \qquad (8)$$

where $S^q$ denotes set S positioned according to q. Following the above notation and definitions from equations (1) and (2), equation (8) can be reexpressed as $$M(t)S = \bigcup_{q \in M} S^q \qquad (9)$$

where the sweep M(t)S is the "trace" left by a set of points S that is moving according to M(t), t ∈ [0,1]. This is illustrated schematically by FIG. 3, wherein a rectangular 2-dimensional set S in general motion M with respect to a fixed coordinate system is shown.

The formulations of equations (8) and (9) assume that the sweep is computed from the fixed coordinate system $F_w$, "observing" the moving coordinate system $F_s$.

Sweep can also be defined as observed from the moving coordinate system $F_s$:

$$sweep(S, \hat{M}) = \bigcup_{q \in M} S^q \qquad (10)$$

The sweep of set S according to the inverted motion $\hat{M}$ is quite distinct from that defined in equation (8), as illustrated by FIG. 4. Note that in both definitions of sweep, the trajectories of distinct points of S generated by the same transformation M(t) need not be congruent, and in general the relationship between these trajectories is not simple.

It must be remembered that sweeping is technically not a method for modeling shapes, but rather a method for modeling the motion of a known shape, or more informally, the "track" or space traversed by a shape in motion. Sweeping is nevertheless extensively used to assist in constructing and modeling shapes and surfaces in both academic and commercial systems, as discussed in the references cited in the later Bibliography. However, as these references also note, sweeping is subject to both intrinsic mathematical or logical limitations, as well as practical computational limitations regarding the size and complexity of the operation.

One major limitation is that sweeps of simple shapes moving in simple motions can be computed in special situations, but not for general shapes and motions. As an example, sweeps of simple shapes (e.g., linear polyhedra) moving in simple linear translations can be computed, but sweeps of complex shapes (shapes more general than linear polyhedra) which rotate and/or translate nonlinearly can run afoul of both the intrinsic and practical problems noted above. In particular, while several methods for generating candidate surfaces bounding the sweep are known (see references 1, 12, and 19 of the Bibliography at the end of this disclosure), robust procedures for a point membership classification (PMC) to determine if a given point is in, on, or out of the sweep defined by expression (8) have been identified only in special situations (see, e.g., reference 7 of the Bibliography). Such situations include: restricting the type of the moving object S, for example to a ball, a convex polyhedron, or a planar cross-section that remains orthogonal to the trajectory; allowing only simple motions M that prevent self-intersections in the sweep, or limiting them to simple translations and rotations; formulating PMC procedures in terms of heuristic numerical sampling and searching algorithms; using rendering methods to compute the image of the sweep without actually computing the complete representation of the sweep; or combinations of some or all of these approaches.

A second major limitation is that in order to perform the sweep operation, both the shape and its motion must be defined. While this limitation may seem so apparent that it does not merit mention, it implies a more subtle disadvantage: the object of most design and modeling efforts is to determine a suitable or optimal shape, and since sweeping cannot be performed with an unknown shape, sweeping does not provide direct assistance in determining a suitable or optimal shape. In this situation, sweeping is used for testing shapes that are initially proposed by designers. To illustrate with a more specific example, consider the problem of part collision (interference) in mechanical design. Interference of static (fixed) parts within an assembly or enclosing envelope can be determined in a straightforward fashion by computing intersection of the corresponding solid models of the parts. Packaging of moving parts by use of the sweep operation is more difficult. A typical situation is shown in FIG. 5: a part S having a defined shape (the shape either being proposed or final) moves within envelope E according to motion M, and must fit inside E while in motion in order to avoid interference. A common way to approach this problem has been to test if E ∩ sweep(S,M)=φ (if the intersection between E and the sweep of S according to M is empty) or if sweep(S,M)—E is not equal to φ, as illustrated in FIG. 6. This test may be difficult to implement owing to the limitations of sweeps noted above. Even when fully implemented, the result of the test is binary: a "yes" or "no" answer is generated, and a "no" answer only indicates that interference occurs without suggesting how S should be modified to fit inside E during M. To perform such modifications, designers must use their experience and intuition to successively redesign and test new shapes S, and this iterative process is inefficient and costly; see, e.g., publication 8 in the Bibliography below.

SUMMARY OF THE INVENTION

The invention, which is defined by the claims set out at the end of this disclosure, is directed to methods and apparata for shaping moving geometric shapes in relative motion. These methods and apparata utilize a new geometric modeling operation which will be referred to herein as unsweep. The unsweep operation asks not whether a defined shape S fits within envelope E during defined motion M, but rather asks what is the largest shape S that fits within envelope E during M. Rather than yielding information as to whether or not the shape S exceeds the envelope E (a binary "yes" or "no"), the unsweep operation instead provides direct shape information in the form of the largest shape S that fits in envelope E.

For the sake of summary, several preferred embodiments of the invention will now be described. Initially, the invention encompasses a method for shaping a geometric model of an object, e.g., a mechanical part, which has initially undefined shape. A motion M for the object is defined, and may consist of one or more of rotation, translation, deformation, scaling, perspective, and visibility, taken either simultaneously or sequentially. An envelope E (i.e., a set of cells) wherein the object moves with motion M is also defined. The envelope E is then unswept in accordance with motion M, the unsweep operation taking any of the various forms discussed at greater length below in the Detailed Description of the Invention section of this disclosure. For example, multiple cells can be defined within E, each cell containing one or more points, and each cell can be tested to see whether it remains within E if it moved according to motion M. The cells remaining within E can then be retained. As another example, E ∩ (E moving in accordance with the inverse of M) cacale calculated, either absolutely or at discrete time intervals during M. In any case, the unsweep operation results in a set of cells or points S which is the largest subset of E fitting within E at all times during motion M.

In the case where the object being shaped is a mechanical part having initially undefined shape, E can be defined as the enclosure wherein the part must operate without collision (i.e., interference), and the motion M can define the relative motion of the mechanical part with respect to the enclosure. In this case, the shape S will represent the largest part S that can fit within enclosure E without interference. The shape S can be used directly as the design for the part, or the part can be designed within the space of shape S to reduce its size.

In the case where the object being shaped is an enclosure having undefined shape wherein a mechanical part of known shape must operate without interference, E can be defined as the complement of the shape of the mechanical part and M can be defined as the inverse of the relative motion of the mechanical part with respect to the enclosure. The complement of the shape S will then represent the smallest enclosure wherein the part can operate without interference, i.e., the walls of the enclosure must be designed outside the complement of S.

In the case where the object being shaped is a first mechanical part having undefined shape which moves in conjugate motion with a second part having defined shape, E can be defined as the complement of the shape of the second part and M can be defined as the inverse of the conjugate motion of the second part with respect to the first. The shape S will then represent the largest first part that can move in conjugate motion with the second part. The shape S can be used directly as the design for the part, or the part can be designed within the space of shape S to reduce its size.

The invention also encompasses shaping using the unsweep operation to determine swept shapes. This can be useful, for example, if one wishes to shape the path traversed by all points of a cutting head during its travel to model the material removal effected by the head. The sweep can be obtained by using the complement of envelope E in place of E (i.e., by defining E as the complement of the actual envelope E of interest) and the inverse of motion M in place of M (i.e., by defining M as the inverse of the actual motion of interest), and then determining the complement of the shape S determined by the unsweep operation.

Additionally, the invention encompasses the use of the known sweep operation to determine unswept shapes. A motion M for the object is defined, as well as an envelope E (i.e., a set of points or cells) wherein the object moves with motion M. The complement of the envelope E can then be swept in accordance with the inverse of motion M to obtain the complement of the unsweep of E in accordance with M, that is, the complement of the shape S equal to the largest subset of points fitting within E at all times during motion M.

The invention also encompasses apparata for performing the methods described above. Such apparata include motion defining means for defining a motion M, envelope defining means for defining an envelope E wherein the motion M occurs, and calculating means for determining the largest shape S that fits within E at all times during motion M. As will be discussed at greater length below in the Detailed Description of the Invention section of this disclosure, the calculating means is preferably provided by appropriately configured software and/or firmware. The motion defining means and envelope defining means can then take the form of appropriate input devices by which users or automated devices (e.g., sensors) can specify motions and envelopes. For example, when the apparatus is embodied in a computer running a computer aided design/computer aided manufacturing (CAD/CAM) program, the user may simply specify one or more of the motion and envelope via keyboard input. As an illustration of the results obtained by this embodiment of the inventive apparatus, the CAD/CAM program could be used to define boundaries wherein a part must be designed to avoid interference with envelope E when moving in accordance with motion M. As another example, where the apparatus is embodied in a manufacturing quality control system, optical imagers or other sensors which can sense locations/dimensions can be used to define envelopes and/or motions. To illustrate results obtained by this embodiment of the inventive apparatus, such a quality control system could propose the largest part that would acceptably fit and operate within the envelope without interference. In this case, the apparatus could further include part defining means (e.g., sensors of user input devices) for defining the shape of a candidate part. Comparison means, e.g., software and/or firmware having embedded logic operations, can then be used to determine whether the candidate part fits within the space occupied by the proposed part.

The advantage of the unsweep operation may be best appreciated by reviewing the case of parts design. As noted above, parts design is generally an iterative process: a proposed part shape is tested versus its operating envelope E in accordance with its motion M (either physically or by use of the known sweep operation), and if it does not work, the part is redesigned. The process is then repeated. The unsweep operation, on the other hand, allows one to start without a proposed design and use the envelope E and motion M to define the largest shape S fitting within E during M. If envelope E and the relative motion M between the part and its envelope are properly defined, unsweep(E, M) effectively provides the shape S of the largest part that would work. The part can then be redesigned within the envelope S for size, cost, or other reasons, or the part can simply be produced on the basis of space S. It can thus be appreciated that the unsweep operation provides an extremely valuable tool for the design and modeling of moving mechanical parts and assemblies, particularly where parts are in conjugate motion (cams, gears etc.), as well as in collision detection.

However, the advances provided by the unsweep operation extend beyond mechanical design and extend to numerous other shape modeling applications, e.g., in computer graphics and imaging. The unsweep operation is applicable to objects and motions of all types and dimensions. It is mathematically deterministic and uses well-defined computations to obtain an informationally complete representation of the moving shape(s), which can then be stored or displayed. No trial-and-error approaches, subjective judgments, or unspecified heuristic method steps are involved. The unsweep operation is useful in virtually any applications wherein moving geometric objects must be modeled.

Further advantages, features, and objects of the invention will be apparent from the following detailed description of the invention in conjunction with the associated drawings.

BRIEF DESCRIPTION OF THE DRAWINGS

FIG. 7 is a schematic view of moving set F as observed from stationary set E at time t=a.

FIG. 9 is a schematic view illustrating set E, motion M, and the set unsweep(E,M).

FIG. 10 is a schematic view illustrating set E, motion M, and the set unsweep(E,$\hat{M}$).

FIG. 11 is a schematic view illustrating the PMC (Point Membership Classification) for two points within set S, one point being "in" S (having a trajectory always remaining inside S) and another having a trajectory passing outside S at some time.

FIG. 12 is a schematic view illustrating the PMC for a point x whose trajectory is "on" or "out" of S.

DETAILED DESCRIPTION OF THE PREFERRED EMBODIMENTS OF THE INVENTION

The Unsweep Operation

Figure 7:
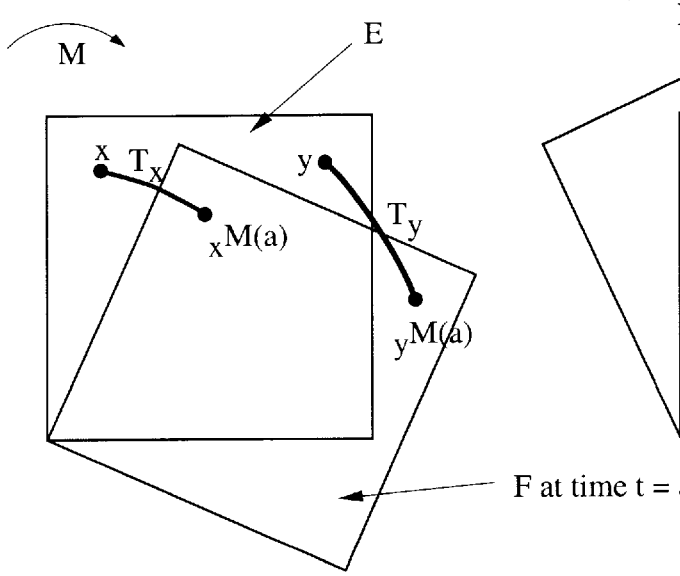

Initially, a description of the mechanics of the unsweep operation is necessary. Consider the set of points E fixed in the global coordinate system $F_w$ and a different set of points F that are moving according to some transformation M(t), t ∈ [0,1]. FIG. 7 shows a simple two-dimensional example where sets E and F are initially the same set of points. Initially, at t=0, the two sets coincide, i.e. $F^{M(0)}$=E. As illustrated in FIG. 7, some of the points x ∈ F will travel outside of E, while others will never leave E.

Unsweep(E,M) is then defined as the set of all those points x that remain inside E for all values of t. Formally:

$$\text{unsweep}(E,M) = \{x | x^{M(t)} \in E, \forall t \in [0,1]\} \tag{11}$$

By this definition, unsweep(E,M) is well-defined and is the largest subset of F that stays inside E while F is moving according to M(t). However, the characterization of unsweep in definition (11) may not provide an insight in the nature of unsweep or possible methods for computing the results of this operation. An equivalent but more convenient definition is obtained by observing that the set $x^{M(t)}$, t ∈[0,1] is simply the trajectory $T_x$ of point x. Therefore, $$\text{unsweep}(E,M) = \{x | T_x \subset E\} \tag{12}$$

The condition in equation (12) is illustrated in FIG. 7: as long as the trajectory $T_x$ of point x stays inside of E, x ∈ unsweep(E,M), while if $T_x$ intersects the complement set $E^c$ then point x is not within unsweep(E,M). (As will be discussed below, this observation may be used to develop a rigorous point membership classification (PMC) procedure for unsweep(E,M).)

Figure 8:
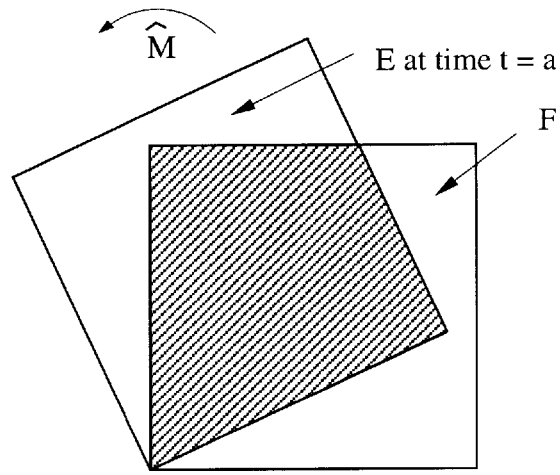
FIG. 8 is a schematic view in accordance with FIG. 7 illustrating set E moving wit motion $\hat{M}$, the inverse of motion M of FIG. 7.

Unsweep can also be characterized by reversing the role of the stationary set E and moving points x ∈ F as illustrated in FIG. 8. It should be clear from the discussion above that by keeping all points x ∈ F fixed, the same relative motion between F and E will be described by a set E moving according to the inverted motion $\hat{M}(t)$. At any instant t=a, the moving set will occupy points $E^{\hat{M}}(a)$. From these points, only the set F ∩ $E^{\hat{M}}(a)$ may remain inside the set F. Since this intersection condition must hold for all values of t, a third equivalent characterization of unsweep is given by $$\text{unsweep}(E, M) = \bigcap_{q \in \hat{M}} E^q \tag{13}$$

Finally, it is noted that the set of points $$\text{unsweep}(E, \hat{M}) = \bigcap_{q \in M} E^q = \{x | \hat{T}_c \subset E\} \tag{14}$$

is not the same set as unsweep(E,M). This is illustrated by FIGS. 9 and 10, which are discussed in greater depth later in this disclosure. FIG. 9 shows the unsweep(E,M), i.e., either the points of set F are moving in pure translation according to M or set E moves according to $\hat{M}$, while FIG. 10 shows unsweep(E, $\hat{M}$) when either the points of set F are moving in pure translation according to $\hat{M}$ or set E moves according to M.

Use of Unsweep to Determine Sweep

It is beneficial to note that sweeps can also be generated by use of the unsweep operation. If set S and motion M are defined as before, and $\hat{M}$ is the inverted motion, then if $X^c$ denotes the complement of a set X, the relationship between the two dual operations sweep and unsweep is given by:

$$[\text{unsweep}(S^c, \hat{M})]^c = \text{sweep}(S, M) \tag{15}$$

This property establishes a link between known and useful properties of both unsweep and sweep and extends the computational advantages of unsweep to general sweeps of moving shapes. In short, based on the duality relationship of equation (15), one can also compute the set swept by shape S moving according to motion M, i.e., sweep(S,M) by computing first the set unsweep($S^c$, $\hat{M}$) and then taking the complement of the result. Similarly, one can find unsweep (S,M) by finding the complement of sweep($S^c$, $\hat{M}$).

Unsweep and Sweep for Purely Translational Motion

This dual relationship between sweep and unsweep is easier to see in the restricted case when M(t) is a pure translation. In this case, each point x of the moving set S sweeps the trajectory $$T_x = x + M(t), t \in [0,1] \tag{16}$$

where both x and M(t) have vector values represented with respect to the fixed coordinate system $F_w$. If x and y ∈ S are two distinct points with respective trajectories $T_x$ and $T_y$, then $$T_x = T_y \oplus (x-y) \tag{17}$$

where ⊕ denotes Minkowski (vector set) addition with the usual properties (see, e.g., reference 17). In other words, every point of S moves on the same trajectory T that is translation invariant and is in fact equivalent to the set of translations M. This implies that set S moves without changing its orientation and that $$\text{sweep}(S, M) = \bigcup_{q \in T} S^q = S \oplus T \tag{18}$$

is also translation invariant. Similarly, using definition (13) of unsweep in terms of the moving set S on inverted trajectory, we have $$\text{unsweep}(S, M) = \bigcap_{p \in \hat{T}} S^p = S \otimes \hat{T} \tag{19}$$

where ⊗ is the usual Minkowski difference operation (see, e.g., reference 17). The rightmost expression is sometimes referred to as erosion and is the set of points {y ∈ S |$T_y$ ⊂ S), which is consistent with definition (12) of unsweep. Notice that $\hat{T}$=−T is simply a reflection of T with respect to the origin of the frame $F_w$ and is again translation invariant.

Unsweep and Sweep for General Motion

Unsweep can be extended to motions more general than pure translation (e.g., to rotation, translation and rotation, sequential series of motions $M_i$, motions including deformations of S in time and/or space, etc.). To understand the extension of unsweep to more general motions, a discussion of Minkowski operations is in order. Minkowski operations have many useful properties and are used extensively in geometric modeling, motion planning, and image processing; see, e.g., references 4, 10, 11, 17, and 20. In particular, definitions of Minkowski operations imply that ⊕ and ⊗ are dual to each other via $$S \oplus T = (S^c \otimes T)^c \quad (20)$$

with $X^c$ denoting the usual complement of set X.

Many properties of Minkowski operations depend on the premise of translation-invariant sets, and do not generalize to sweeps and unsweeps under motions other than translations. But a number of Minkowski properties follow strictly from standard considerations and definitions of set theory. One would expect that all such properties should extend to more general motions. Indeed, the duality of operations $\oplus$ and $\otimes$
is one such property that generalizes to the duality of the operations sweep and unsweep as defined in this invention.

To apply these principles to the case of motions more general than pure translations, equation (20) can be rewritten in set theoretic terms as $$\bigcup_{q \in T} S^q = \left[ \bigcap_{q \in T} (S^c)^q \right]^c \quad (21)$$

$$\left( \bigcup_{q \in T} S^q \right)^c = \bigcap_{q \in T} (S^q)^c \quad (22)$$

This is true since $(S^c)^q = (S^q)^c$. The equality of equations (21–22), and hence the duality of $\oplus$ and $\otimes$, is simply a restatement of the usual DeMorgan's laws for operations of union and intersection generalized for arbitrary number or families of sets (see, e.g., reference 9). The straightforward application of the same law in the case of general motion M yields $$\left( \bigcup_{q \in M} S^q \right)^c = \bigcap_{q \in M} (S^q)^c \quad (23)$$

or $$[sweep(S, M)]^c = unsweep(S^c, \hat{M}) \quad (24)$$

which is equivalent to the relationship (15); in other words, sweeping (unsweeping) set S with motion M is equivalent to unsweeping (sweeping) the complement of S with the inverted motion $\hat{M}$ and complementing the result.

PMC for Unsweep and Sweep

In order to obtain results from the unsweep operation, it is necessary to define an appropriate point membership classification (PMC) scheme. PMC is a procedure for deciding whether a given point x is inside, outside, or on the boundary of a set S (see, e.g., reference 21. It has its roots in solid modeling, and set S is usually a d-dimensional solid (d=1,2,3). The PMC procedure is a sign of "informational completeness" of a representation scheme indicating that any geometric property can be computed, at least in principle (reference 16). As a matter of practical importance, PMC is used in almost all geometric modeling algorithms, including boundary evaluation, discretization, and rendering. PMC is a special case of the Set Membership Classification function that, given a candidate set X and S, computes (regularized) portions of X on S, X in S, and X outside of S (reference 21).

When applying PMC to unsweep (and sweeps using unsweep), no assumption need be made that S is regular. The unsweep operation (and sweeps using the unsweep operation) may result in sets that are not regular, i.e. dimensionally inhomogeneous sets with "dangling" faces, edges, or isolated points. Closed regular sets are not closed under the Minkowski difference (examples are given, e.g., in reference 15), and it is easy to construct similar examples showing that unsweep of a regular set S may not be regular.

To use the definitions of unsweep to obtain a PMC procedure for the general unsweep (and then general sweep), standard PMC notions can be generalized in a manner consistent with definitions set out in reference 18. We will say that point x is "in" set S when there is an open neighborhood of x contained in S; point x is "out" of S when some open neighborhood of x is contained in the complement set $S^c$; and x is "on" S if every neighborhood of x intersects both S and $S^c$. The last condition implies that $x \in \partial S$ is a boundary point, but in reality, x may or may not belong to S because set S could be open, closed, or neither.

The basis for a sound PMC procedure is supplied by equations (11–12), along with an appropriate interpretation of the moving point trajectory $T_x$. The PMC definitions imply that not only a moving point x must be considered, but also its open neighborhood ball $B(x^{M(t)})$ of points that is transformed with x. To perform PMC on unsweep(S,M), the trajectory of each point x must be determined, and then three situations must be considered:

1. If trajectory $T_x$ remains in the interior iS of S, then point $x^{M(t)}$ remains inside S for all values of t during the motion M(t) that generated $T_x$. In this case x is "in" unsweep(S,M). There is thus an open neighborhood $B(x^{M(t)})$ of points that remain in the interior iS of S for all t (see FIG. 11).

2. Whenever $T_x$ intersects the boundary $\partial S$, the neighborhood $B(x^{M(t)})$ gets "trimmed" by $\partial S$, as illustrated in FIG. 12. This implies that no open neighborhood of x is contained in unsweep(S,M), and therefore x cannot be "in"; thus, x must be either "out" or "on" unsweep (S,M).

3. Additional neighborhood analysis to distinguish between "on" and "out" cases depends on properties of set S (open, closed, dimension) and trajectory $T_x$ (whether it intersects $\partial S$ transversally, whether it remains inside S, etc.) In all cases, the analysis amounts to determining whether the neighborhood $B(x^{M(t)})$ of the moving point gets "trimmed" down to the empty set $\phi$. If so, the point x must be "out" of unsweep (S,M). Otherwise, x remains "on."

Figure 13:
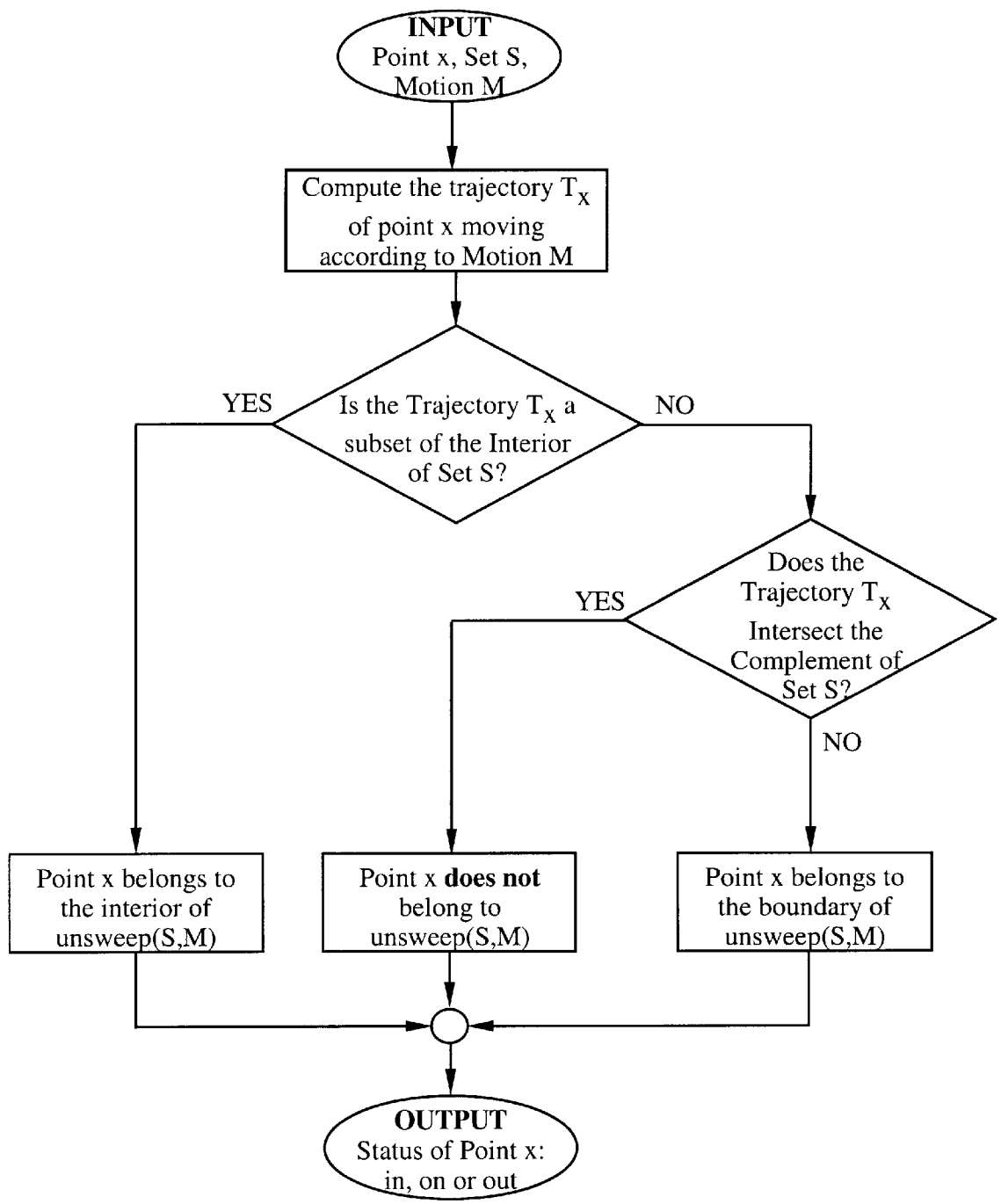
FIG. 13 is a flow diagram of the PMC procedure for a point x within set S moving with motion M.

As an example, consider a common case when S is any closed set. As long as the trajectory $T_x$ does not go outside of S, point x cannot classify as "out." Therefore, as shown in FIG. 13, the PMC procedure reduces to the straightforward classification of a curve T(x) against a representation for set S:

$$PMC(x, unsweep(S, M)) = \begin{cases} in, & T_x c iS \\ out, & T_x \cap S^c \neq \phi \\ on, & otherwise \end{cases} \quad (25)$$

and it remains correct irrespective of homogeneity or dimension of S, assuming that boundary, interior, and complement are all defined relative to the same universal set. The focus of the PMC procedure is computing the intersection between the trajectory $T_x$ and the given representation of set S, whether S be in b-rep (boundary representation) form, CSG (constructive solid geometry) form, or whether S is represented in yet another manner.

By duality, we can use the same technique to construct a PMC procedure for any sweep(S,M). Since $$\partial[sweep(S,M)] = \partial[unsweep(S^c, \hat{M})] \quad (26)$$

it is sufficient to classify point x against unsweep($S^c$, $\hat{M}$) and simply exchange "in" and "out" results. However, notice that whenever S and sweep(S,M) are closed sets, set $S^c$ and unsweep($S^c$ and $\hat{M}$) are open, and the PMC conditions are slightly different from equation (25) above and FIG. 13. Since the boundary $\partial(Y)$ of an open set Y is a subset of $Y^c$, the condition $T_x \cap Y^c \neq \phi$ may imply that point x is either "on" or "out" of Y. In this situation, additional neighborhood analysis may be required to distinguish between the two cases; however, this problem does not arise in solid modeling applications when all sets are regularized. Finally, note that when S is a planar cross-section moving in $E^3$, this PMC approach on sweep(S,M) yields the procedure proposed in reference 7.

Application of the Unsweep Operation to Shapes

Figure 14:
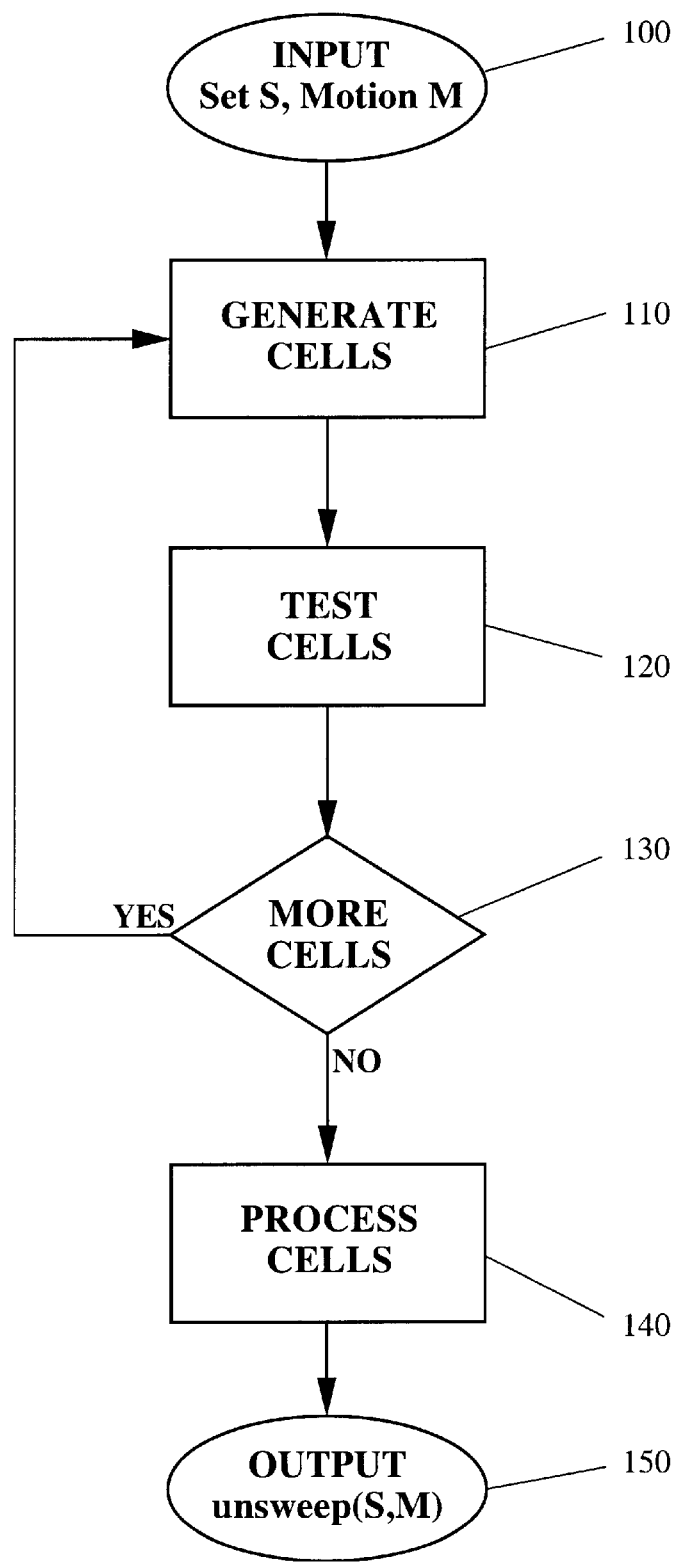
FIG. 14 is a flow diagram of one embodiment of the unsweep operation.

FIG. 14 illustrates a flow diagram illustrating the unsweep operation in greater detail. The following steps are illustrated:

1. Step 100: Shape and Motion Formulation Representations of geometric set S to be unswept (i.e., the set S of points representing the shape) and the motion M are defined in accordance with the d-dimensional Euclidean space of interest.
2. Step 110: Cell Generation A set of candidate "cells" are generated in the d-dimensional Euclidean space about unsweep(S,M). No particular type of cells (e.g., triangles, balls, tetrahedra, cubes, disconnected, pixels, voxels, etc.) is preferred, and the user may define the cells as per personal preference and/or to fit the application at hand.
3. Step 120: Test Cell by PMC The cells of step 110 are considered to fall into one of the following categories:
   (a) cells that fully belong to the sought set unsweep(S, M).
   (b) cells that partially belong to the set unsweep(S,M).
   (c) cells that do not belong to the set unsweep(S,M).

In step 120, every cell generated at step 110 is tested via PMC against the original set S to determine which of the above categories that particular cell lies in. The cells in set (a) above pass the test, the cells in set (c) fail the test, and the "indeterminate" or "boundary" cells in set (b) may pass, fail, or be processed further, as explained later in this description.
4. Step 130: Determine if More Cells need to be Generated If a desired termination condition is not met (e.g., if set (b) is too large or does not provide a set (a) with the desired resolution), Steps 110 and 120 are repeated until the termination condition is met. In other words, steps 110 and 120 are repeated until it is decided that set (a) is empty or is sufficiently well defined that no further repetition is necessary.
5. Step 140: Process Cells If desired, the cells that pass the test from step 120 may be further processed to obtain a compact data structure for their union.
6. Step 150: Output Unsweep The results of step 140 are output to provide a representation of the set of points unsweep(S,M).

Figure 15:
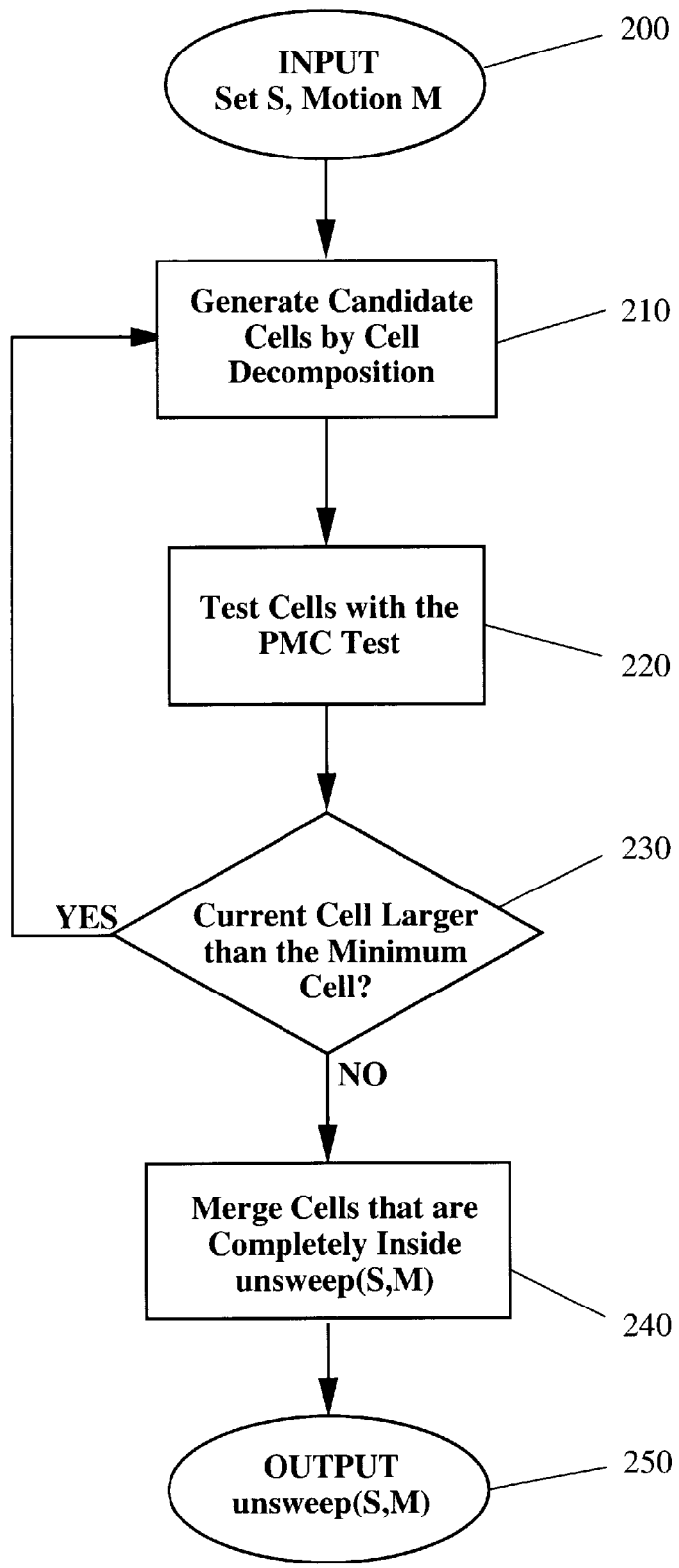
FIG. 15 is a flow diagram of another embodiment of the unsweep operation.

The general process shown in FIG. 14 can be implemented in more than one way to compute unsweep(S,M), particularly insofar as all of steps 110–140 can be practiced in a variety of different ways. FIG. 15 shows a particular implementation of the process in FIG. 14 using spatial partitions known as octrees (see, e.g., reference 5), wherein the steps of FIG. 14 can be restated as:

1. Step 200: Define S, the geometric shape to be unswept, and M, the motion.
2. Step 210: Candidate cells are generated by recursively decomposing the space wherein S exists and M occurs into orthogonally aligned boxes (octants in three dimensions, or quadrants in two dimensions).
3. Step 220: PMC is performed to determine whether the vertices (and possibly some additional points) of each of the candidate cells/boxes are inside the result unsweep(S,M), outside of unsweep(S,M), or neither. As noted above, this will generally be done by computing the trajectories of the points of interest and then intersecting the trajectories with the boundary of S, and applying the PMC decisional tests.
4. Step 230: Each cell in question is tested against the cell of minimum size to determine whether further cells are necessary.
5. Step 240: In this optional step, the cells that are completely inside unsweep(S,M) are processed to obtain a compact data representation of the set unsweep (S,M).
6. Step 250: The results of step 240 are output.

Figure 16:
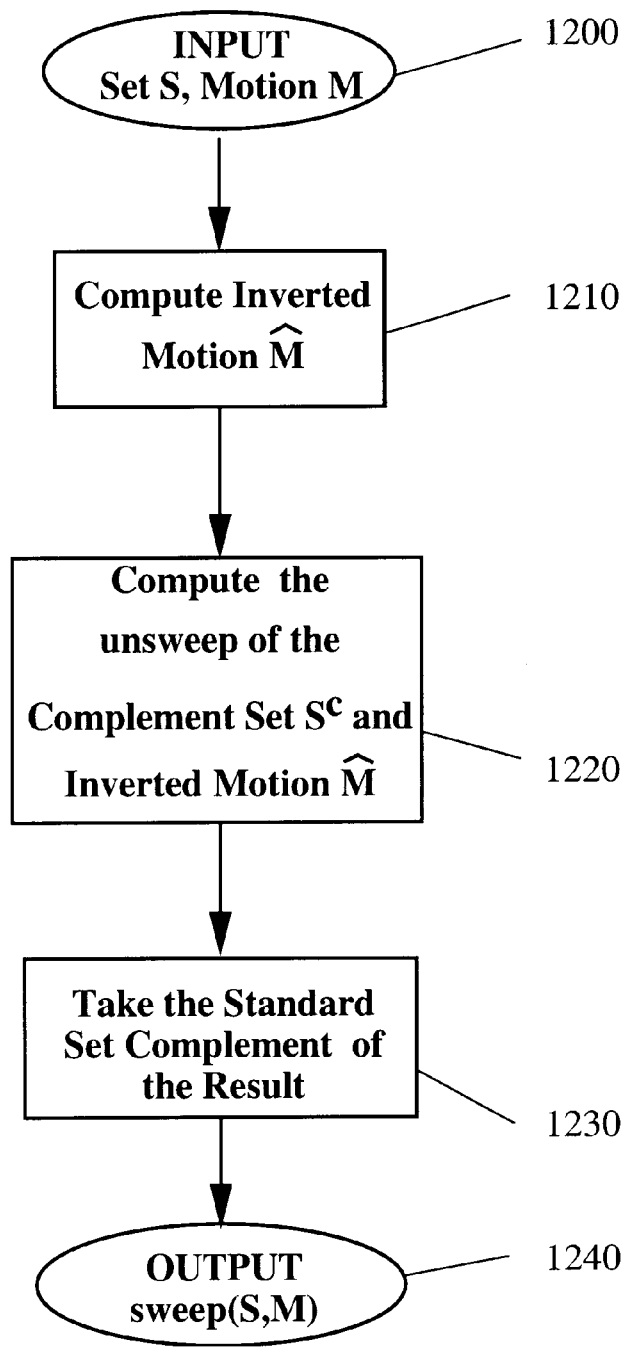
FIG. 16 is a flow diagram of the use of the unsweep operation to determine sweep.

As noted above, it is also possible to calculate sweep by use of the unsweep operation. The flow diagram of FIG. 16 illustrates the use of the unsweep operation to obtain sweep based on the duality relationship of equation (15) above.

Figure 17:
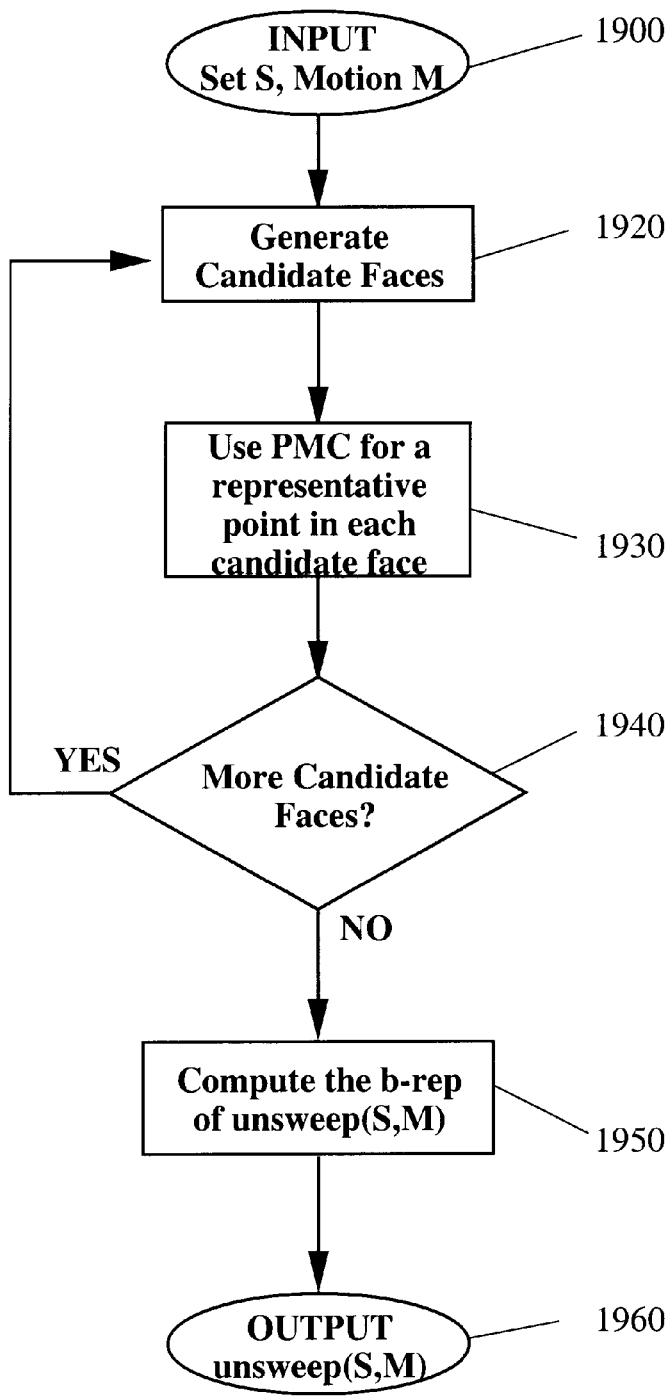
FIG. 17 is a flow diagram of the determination of the boundary representation of unswept set.

Rather than using PMC to determine all cells that are completely inside unsweep(S,M), it may instead be desirable to instead compute its boundary representation (i.e., to obtain an output of only the faces that belong to the boundary of unsweep(S,M)). FIG. 17 shows the adaptation of the general procedure of FIG. 14 to compute the boundary representation of unsweep. The important features of this modification include:

1. Step 1: Generate Cells In step 1920 one generates surfaces bounding the unsweep and intersects the generated surfaces to produce a set of potential candidate faces or cells;
2. Step 2: Test Cells Step 1930 tests which of the candidate cells lie on the boundary of unsweep by taking a representative point in each cell and performing the PMC test for this point (e.g., as illustrated in FIG. 13).
3. Step 3: Test Condition In step 1940, one tests if there are no more candidate faces to be generated.
4. Step 4: Process Cells In step 1950 one keeps only the candidate faces that belong to the boundary of unsweep (S,M) and merges the adjacent cells to construct the boundary representation of unsweep(S,M).

For performing exact boundary evaluation for unsweep (as in FIG. 17), the shared boundary of unsweep and its dual sweep (see equation (26)) implies that all the methods used in generating bounding surfaces for computing sweep (see, e.g., references 1, 12, and 19) are also applicable to computing bounding surfaces in unsweep. The degree of difficulty of obtaining candidate faces in step 1920 depends on the types of candidate bounding surfaces generated that are further intersected to obtain the candidate faces, while the step 1930 amounts to selecting a representative point in each candidate face and testing it against unsweep(S,M) using the PMC procedure described above.

In similar fashion, the output need not consist of either an entire representation (e.g., CSG representation) of the set unsweep(S,M) or the b-rep of unsweep(S,M), and could instead simply be of any other subset of points from unsweep(S,M) for which the user has a particular interest. For example, the output could be a picture of certain points from unsweep(S,M) rather than the complete set. The selection of an appropriate output format may be made according to the user's preferences.

Unsweep as a Finite Intersection

Figure 18:
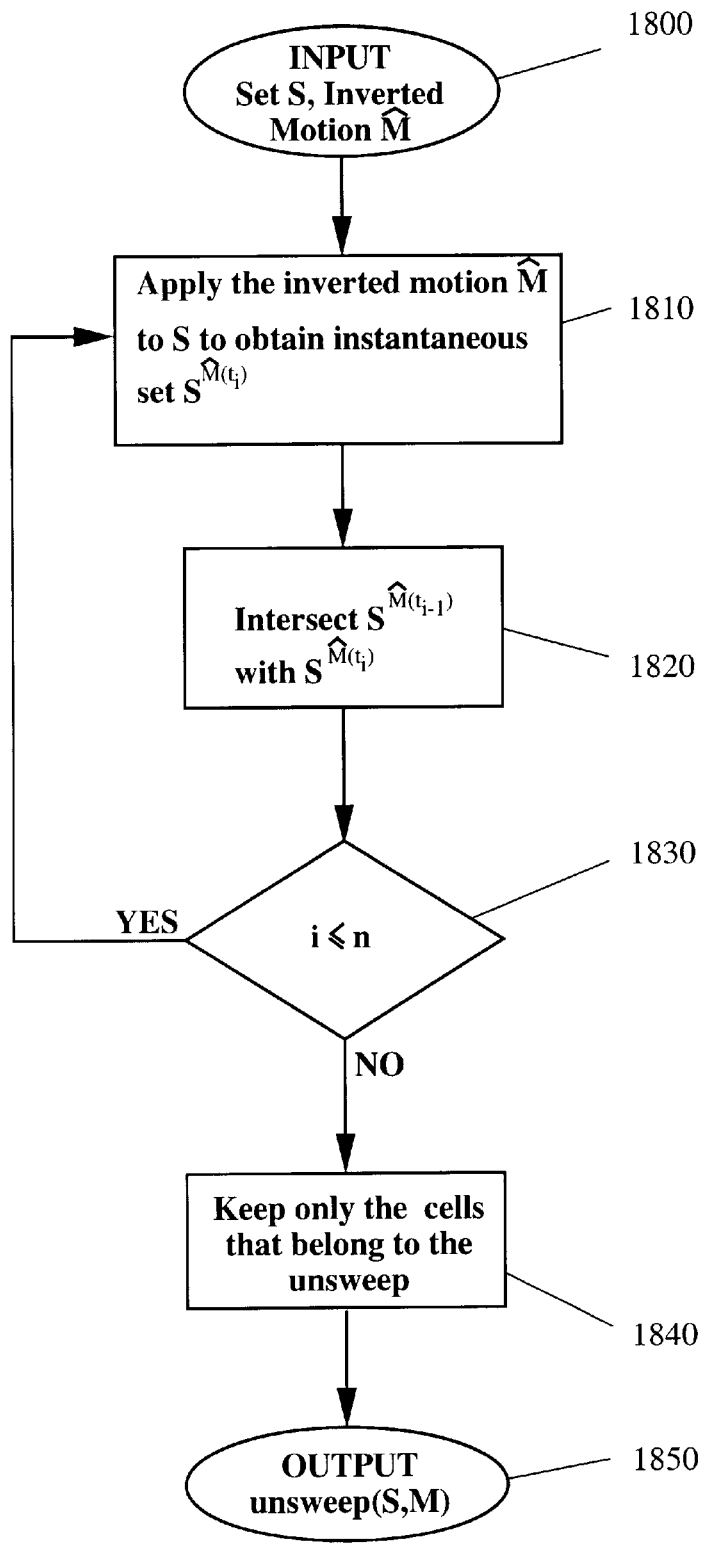
FIG. 18 is a flow diagram of the approximation of unsweep by use of finite intersections of sets at different times.

Equation (13) suggests that unsweep(S,M) may be approximated by a finite intersection of sets $S^{\hat{M}}(t)$ positioned at discrete time intervals according to the inverted motion $\hat{M}$. Intuitively, at every time step t=a, the "unwanted" portions of $S^{\hat{M}}(t)$ that protrude outside of $S^{\hat{M}}(0)$ are eliminated through the intersection operation, as indicated in FIG. 18. This procedure requires a partitioning of the time interval that corresponds to the given motion M. This procedure is easy to implement in any system that supports the desired transformations (e.g., rigid body motions) and Boolean set operations. When S is a solid, good performance and quality of the unsweep approximation can be obtained by using raycasting software and hardware techniques such as those described in references 13 and 14.

With reference to FIG. 18, assume a partitioning of the time interval in n subintervals $[t_{i-1}, t_i]$, i=1 . . . n. For every instance i, the cell generation step 1810 is accomplished by moving the set S according to the inverted motion $\hat{M}$ by applying the instantaneous transformation $\hat{M}(t_i)$ to set S. Set S is obtained positioned at instance i, $S^{\hat{M}}(t^i)$. The "test cells" step 1820 is performed by taking the intersection between the sets $S^{\hat{M}}(t^{i-1})$ and $S^{\hat{M}}(t^i)$ according to equation (13). Those cells that are part of the intersection will belong to the set unsweep(S,M), while others will not. Termination condition 130 from FIG. 14, which is the fourth step 1830 of FIG. 18, translates in testing if the current configuration has reached the final configuration for the prescribed motion M or, in other words, if i≦n. Step 1840, i.e., processing the cells, reduces to "throwing away" all cells that do not belong to the set unsweep(S,M), or equivalently do not belong to the intersection in equation (13). The final step 1850 of this procedure is the output of the set unsweep. Note that the above steps 1800–1850 in FIG. 18 correspond exactly to the respective steps 100–150 in FIG. 14.

Figure 21:
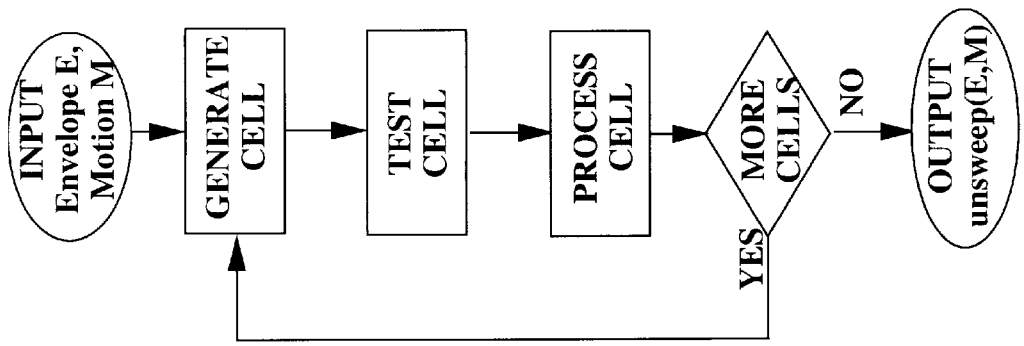
FIG. 21 is a flow diagram of another embodiment of the unsweep operation.
Figure 20:
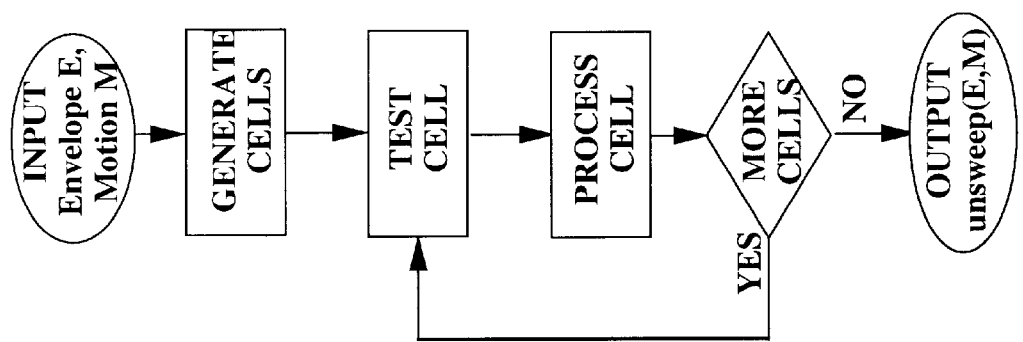
FIG. 20 is a flow diagram of another embodiment of the unsweep operation.
Figure 19:
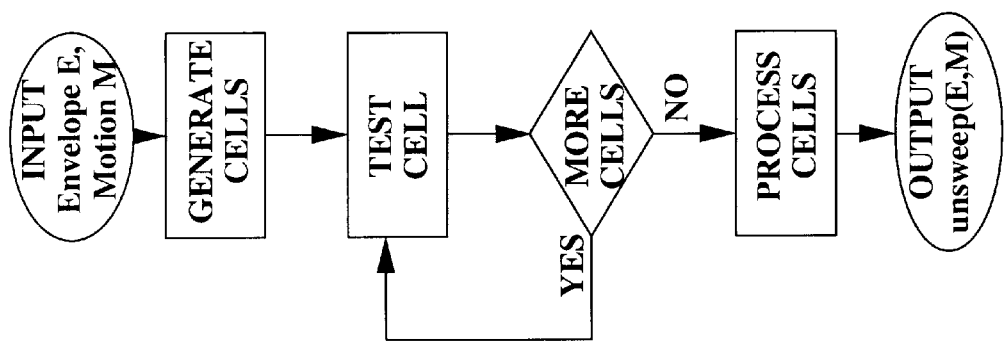
FIG. 19 is a flow diagram of another embodiment of the unsweep operation.

It is notable that depending on the strategies one chooses to implement the unsweep operation, the order in which the cells are generated and tested can be varied. For example, if an approach such as marching cubes is used (see, e.g., reference 5), the generation of new cells may depend on the results of testing other cells. Exemplary variations in the order of generation and testing steps is shown in FIGS. 19–21.

General Implementation of the Unsweep Operation

Figure 22:
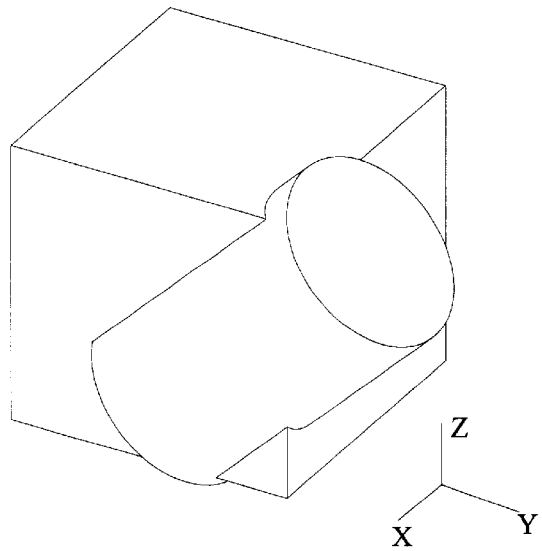
FIG. 22 is an orthogonal view of a shape S.
Figure 23:
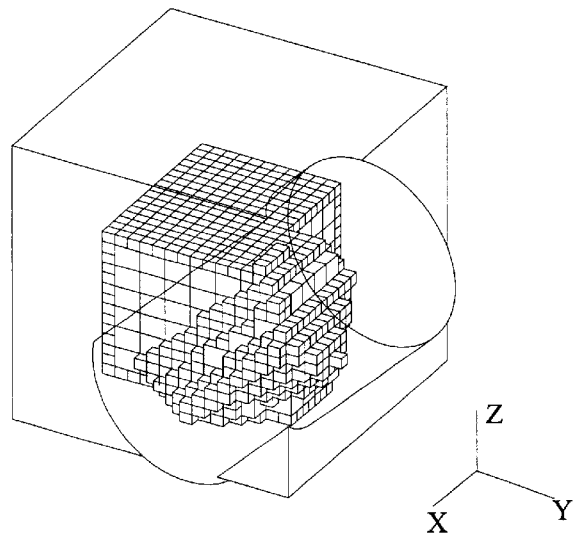
FIG. 23 is an orthogonal view of the unsweep of the shape S superimposed with S, the shape moving in accordance with the motion depicted in FIGS. 24–26.
Figure 24:
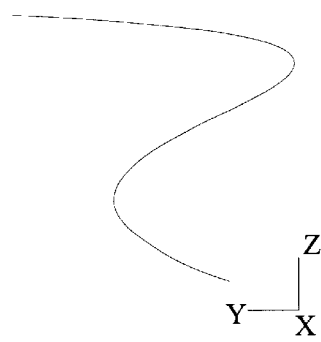
FIG. 24 is a view of the motion of the shape S of FIG. 22 as seen in the YZ plane.
Figure 25:
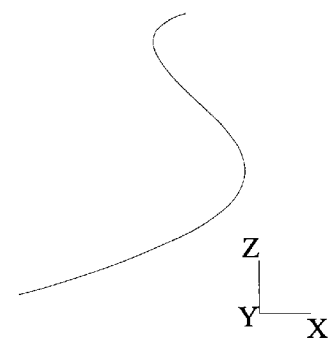
FIG. 25 is a view of the motion of the shape S of FIG. 22 as seen in the XZ plane.
Figure 26:
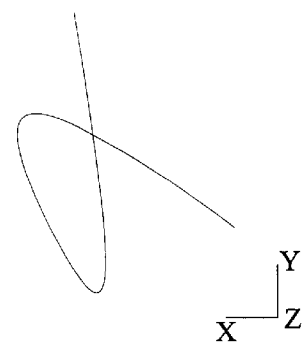
FIG. 26 is a view of the motion of the shape S of FIG. 22 as seen in the XY plane.

The unsweep operations described above can be implemented by hand, but owing to the size of the necessary computations, implementation on software residing in a computer memory and/or firmware (e.g., Application Specific Integrated Circuits) is preferred. Custom-programmed software can be prepared to formulate unsweep in accordance with the discussion set out above, or commercially available mathematical toolkits such as MATHEMATICA (Wolfram Research, Champaign, Ill., USA) or MATLAB (Mathworks, Cambridge, Mass., USA) could be used. Of course, implementation in available solid and shape modeling systems is possible. In the Appendix, PROGRAM A illustrates an implementationtation of the unsweep operation of FIGS. 13–15 using the KID (kernel interface driver) toolkit of the PARASOLID solid modeling system (EDS Unigraphics, Cypress, Calif., USA/Shape Data Ltd., Cambridge, England). The data sets illustrated in PROGRAM A relate to the shapes/motions illustrated in FIGS. 22–26, wherein the shape of FIG. 22 (a combined cylinder and cube) move according to the motion M illustrated in FIGS. 24–26. FIG. 23 displays the unsweep(S,M) computed by PROGRAM A (the unswept set being represented by the merged set of octrees illustrated within the original set S). PROGRAM B then illustrates implementation of the unsweep operation by use of the finite intersection method noted above.

Figures 27, 28:
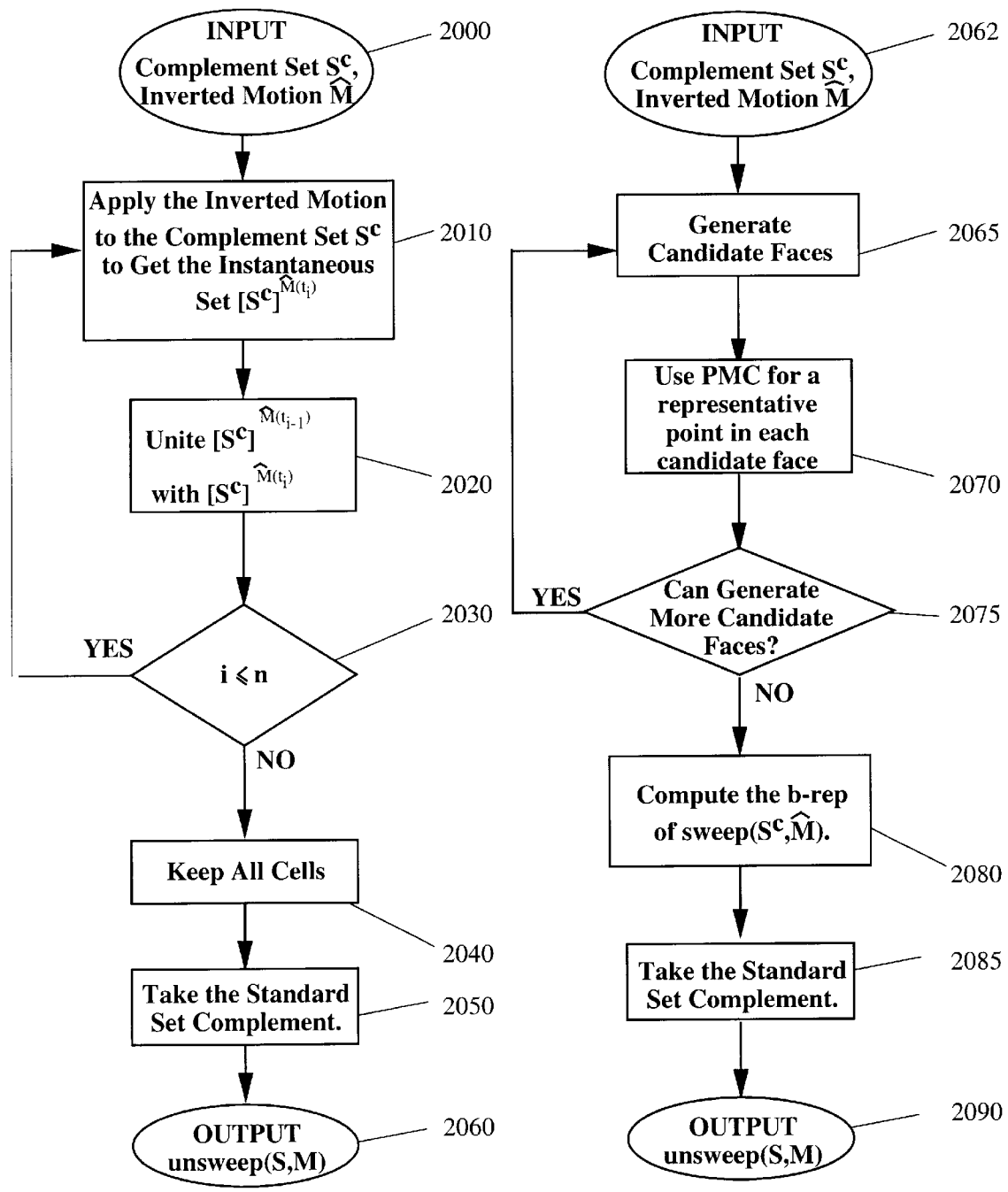
FIG. 27 is a flow diagram illustrating the determination of unsweep using the set complement of finite intersections of swept sets at different times.
FIG. 28 is a flow diagram illustrating the determination of unsweep using the set complement of the boundary representation of the sweep.

It is notable that owing to the duality between unsweep and sweep (as illustrated by equation (15) above), unsweep can be implemented by adding additional steps to preexisting sweep generators. In short, depending on the tools one already has available at hand, unsweep may most easily be performed with resort to preexisting sweep generators. FIGS. 27 and 28 illustrate two ways of using preexisting sweep generators to calculate unsweep.

Further Results of Unsweep Operation

Several examples should help to better illustrate the nature of the unsweep operation, or more particularly, how the results of the unsweep operation are generally not intuitive and would be difficult to obtain manually. Referring back to FIGS. 9 and 10, which illustrate the difference between unsweep(E,M) and unsweep(E, $\hat{M}$) with the same L-shaped envelope E (M being a translation along a circular arc, and $\hat{M}$ being the translational motion along the reflected arc with respect to the origin), it would be difficult for even skilled designers to assert that the resulting shapes unsweep (E,M) and unsweep(E, $\hat{M}$) are easy to obtain conceptually, given E and M. As the shapes and motions extend beyond polygonal envelopes and simple translations and/or rotations, the results of the unsweep operation generally become even more unexpected. Several three-dimensional examples of unsweep, computed according to equation (13), are shown in FIGS. 29–32.

Figure 29:
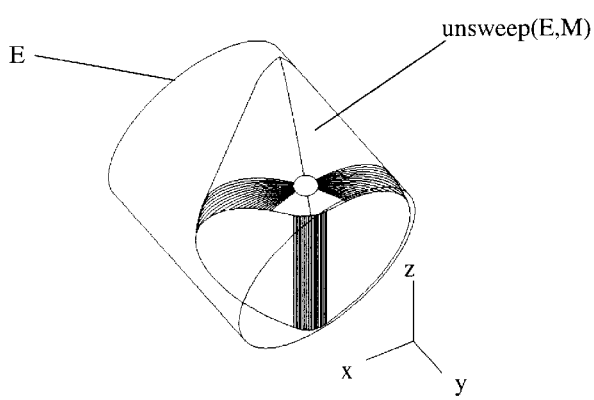
FIG. 29 is an orthogonal view of the unsweep of a cylinder E having motion M about the illustrated hole.

FIG. 29 provides a cylindrical envelope E with rotational motion M around the axis aligned with the center of the shown hole (parallel to the z-axis and perpendicular to the axis of the cylinder). The computed set unsweep(E,M) is shown inside the cylinder and represents the largest subset of E which remains inside E while turning around the rotational axis in the counterclockwise direction.

Figure 30:
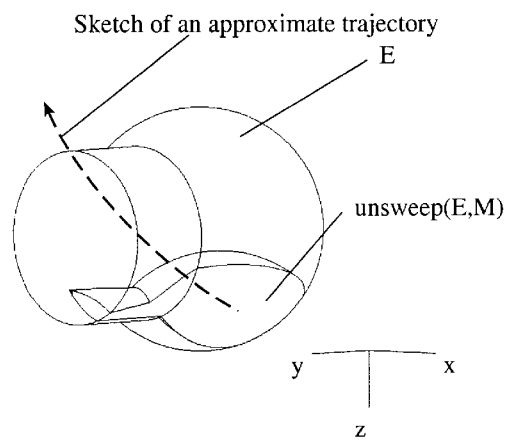
FIG. 30 is an orthogonal view of the unsweep of the united cylinder and sphere E having motion M.

FIG. 30 shows an envelope E defined by the union of a cylinder and a sphere, with M being inverted from a "helical" motion $\hat{M}$ that is given by $\theta_z(t)$=t, x(t)=R cos(t), y(t)=R sin(t), and z=10 t.

Figure 31:
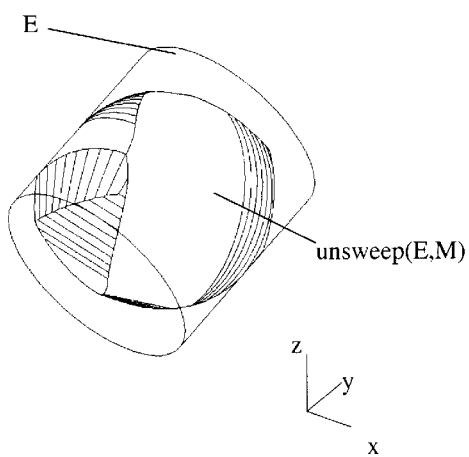
FIG. 31 is an orthogonal view of the unsweep of the cylinder E having motion M consisting of a series of two rotations.

In FIG. 31, E is a cylinder and M is a sequence of two rotations: first 1 radian rotation around the x-axis (1 0 0), then another 1 radian rotation around the axis aligned with (0 1 1), with these axes being positioned so that they intersect the axis of the cylinder at the same point (not shown).

Note that based on equation (13), the unsweep operation preserves convexity of the envelope; thus, if E is convex, unsweep(E,M) will also be convex as in FIGS. 17(*a*) and 17(*c*). FIG. 30 shows that in general, unsweep(S,M) does not have to be convex, but intuitively it will never be "any less convex" than the generator object S. This is a helpful feature of unsweep because convexity greatly enhances the ease of computation.

From these examples, it is easy to see that as the envelope and motions become more complex, predicting the shape of unsweep(E,M) becomes very difficult (if not impossible) without proper computational support. This may explain why the unsweep operation has not previously been formulated, and why manual operations seeking the end result of the unsweep operation have not previously been formulated or used.

Figure 32:
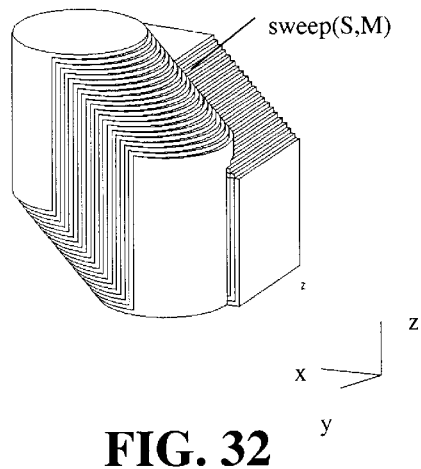
FIG. 32 is an orthogonal view of the sweep of the united cylinder and cube E moving according to motion M, wherein the sweep was determined as the unsweep of the complemented set E moving according to the inverted motion $\hat{M}$.

The final example of FIG. 32 shows a translational sweep along vector (1 1 1) of a simple solid S which is defined by the union of a cube and a cylinder. The illustrated sweep was computed as the unsweep of the complemented set by use of the duality equation (15). For practical purposes (e.g., to conserve memory), the universal set is portrayed by a bounding box that is large enough to contain the sweep. Then the (relative) complement of S is simply the set difference of the bounding box and S.

Application of Unsweep: Detection and Elimination of Collision

Figure 1:
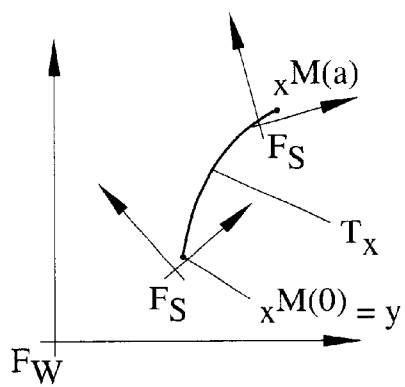
FIG. 1 is a schematic view illustrating the trajectory of a point x generated by motion M(t) as seen from the fixed coordinate system $F_w$.
Figure 2:
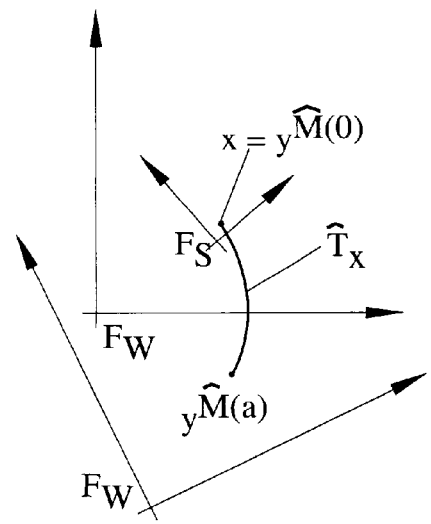
FIG. 2 is a schematic view illustrating the trajectory of a point x generated by motion M(t) as seen from the moving coordinate system $F_s$.
Figure 3:
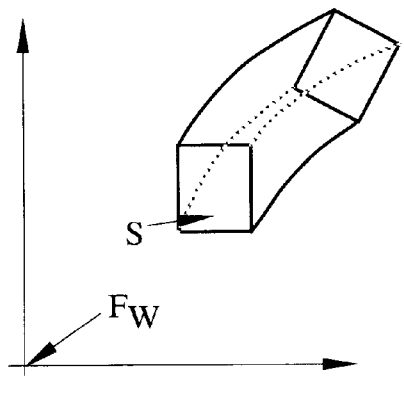
FIG. 3 is a schematic view illustrating the sweep of a rectangular two-dimensional set S in general motion M with respect to a fixed coordinate system $F_w$.
Figure 4:
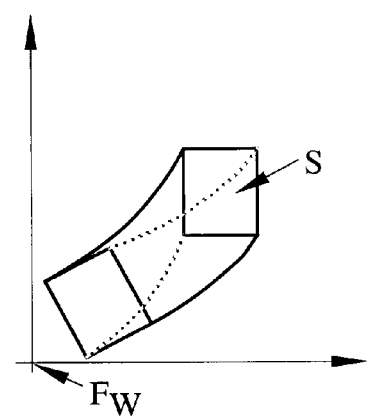
FIG. 4 is a schematic view illustrating the sweep of the rectangular two-dimensional set S of FIG. 3 moving according to the inverted motion $\hat{M}$.
Figure 5:
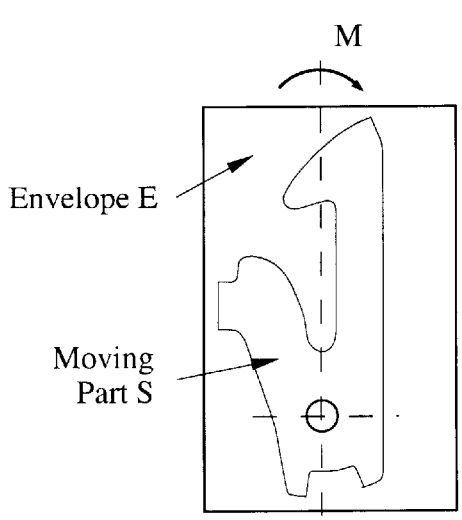
FIG. 5 is a schematic view of a shape S in an envelope E according to motion M.
Figure 6:
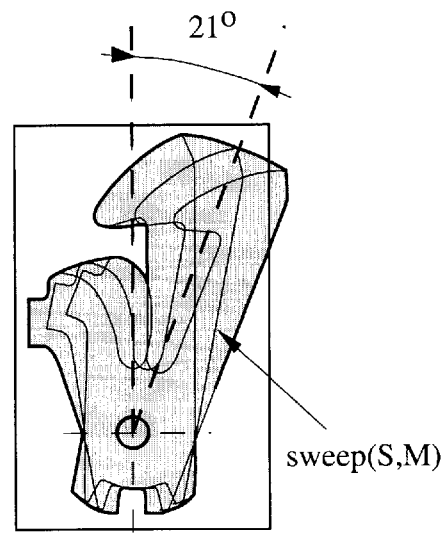
FIG. 6 is a schematic view in accordance with FIG. 5 illustrating shape S in various locations according to M.
Figure 33:
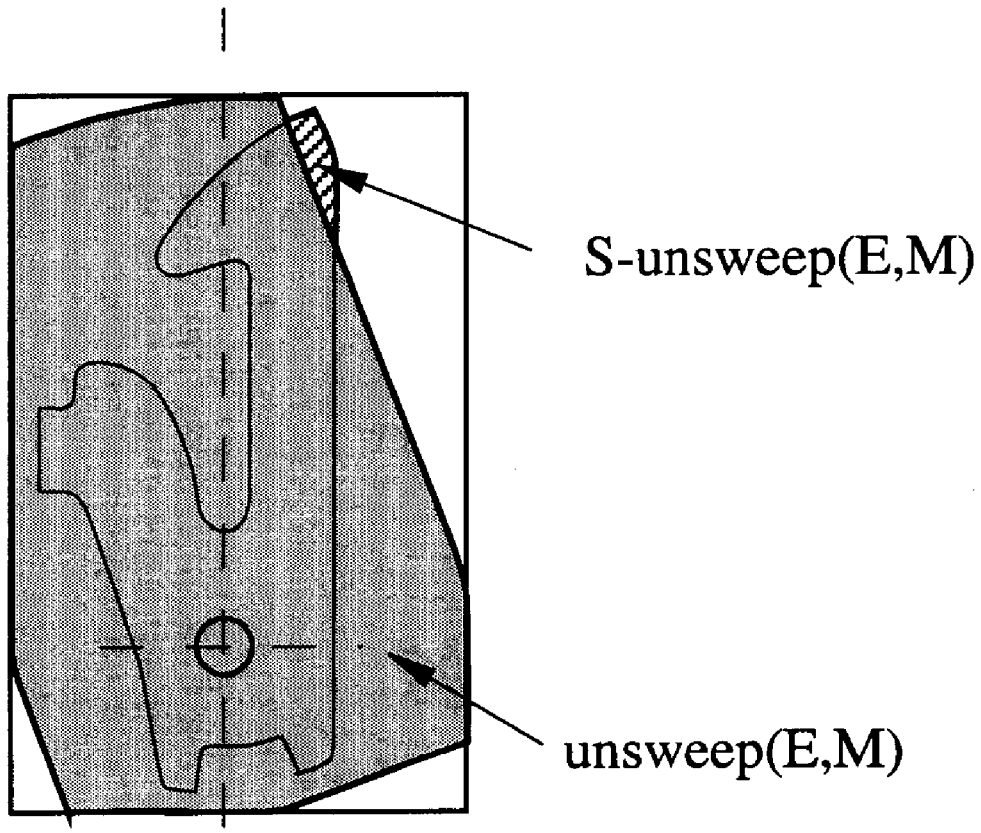
FIG. 33 is a schematic diagram in accordance with FIGS. 5 and 6 illustrating application of the unsweep operation.
Figure 34:
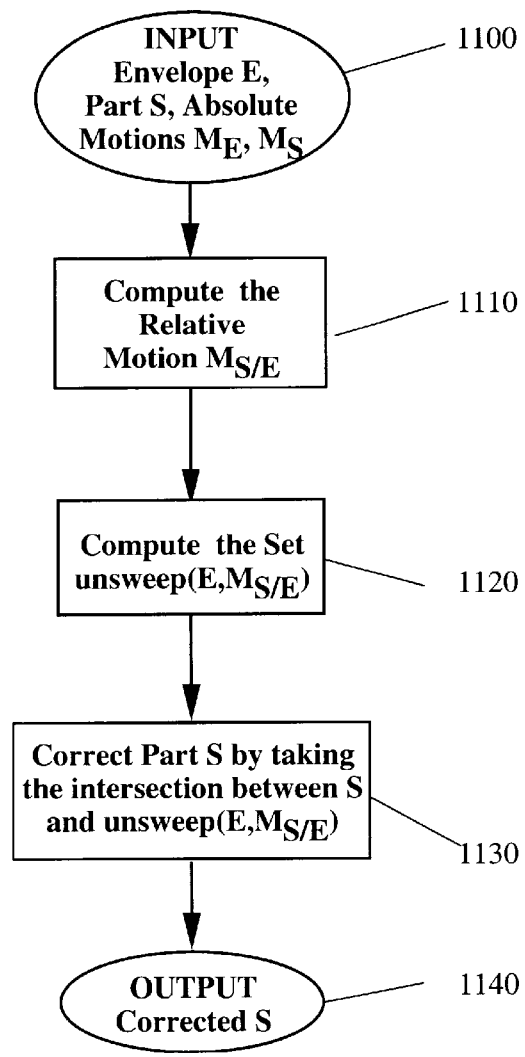
FIG. 34 is a flow diagram illustrating the process of determining the portion(s) of a part S that does not fit within envelope E by use of the unsweep operation.

One of the most general and useful implementations of the unsweep operation is its use in detecting and eliminating collision (e.g., interference) between two moving shapes. A good illustration of this implementation can be had by referring to FIGS. 5 and 6 and the packaging problem summarized above in the section entitled Background of the Invention. In this case, computing unsweep(E,M) yields the largest shape $S_{unsweep}$, the largest part that can fit inside envelope E while experiencing motion M (see FIG. 33). If desired, the interfering portion of a previously proposed part shape S can be calculated as S-unsweep(E,M). This process of determining the modifications to a part S that does not fit within envelope E is also illustrated by the flow chart of FIG. 34.

Application of Unsweep: Shape Design of Objects in Relative Motion

A more specific application of the unsweep operation that has particularly high utility is the shape design of objects in relative motion. When implementing the unsweep operation as noted above, M can be a relative motion between any two moving shapes that are defined partially or completely (e.g. a shape may correspond to the whole space, to an unbounded region, or to a coordinate system). The versatility of unsweep is thereby greatly enhanced by creative and thoughtful definition of the framework in which the shapes and their motions are defined. An example of a particularly valuable application of unsweep is where the shapes are defined to be in conjugate motion, that is, in relative motion wherein the shapes are constrained to be in contact with each other at all times (e.g., as in cam-follower mechanisms, gear meshing etc.). Mechanical devices make widespread use of objects in conjugate motion: the valves of a car engine are opened by a cam shaft; mechanical transmissions and speed reducing assemblies utilize gears or other intermeshing parts; Geneva mechanisms transform continuous rotation to incremental (step by step) motion; and Wankel engines use the conjugate rotation of a modified piston-cylinder system for propulsion. As noted above, the unsweep operation can be used to define the largest space in which a part with yet-unknown shape may fit. A particular advantage of using unsweep for objects in conjugate motion is that the part shape defined by unsweep will often completely define the optimal shape of the part in question, i.e., the shape that produces the "best fit" with other parts. This is particularly beneficial since parts are often "overdesigned" to avoid collision problems, that is, they are often made smaller than the largest shape necessary to avoid interference, and they tend to wear faster owing to the resulting less-than-optimal fit. Since parts in conjugate motion will theoretically fit perfectly if designed using unsweep, they should not only avoid interference, but should also avoid any undue wear or "rattle" owing to excessive clearance between parts. Further, they will often have an enhanced aesthetic appearance as well owing to their "best fit" design.

Figure 35:
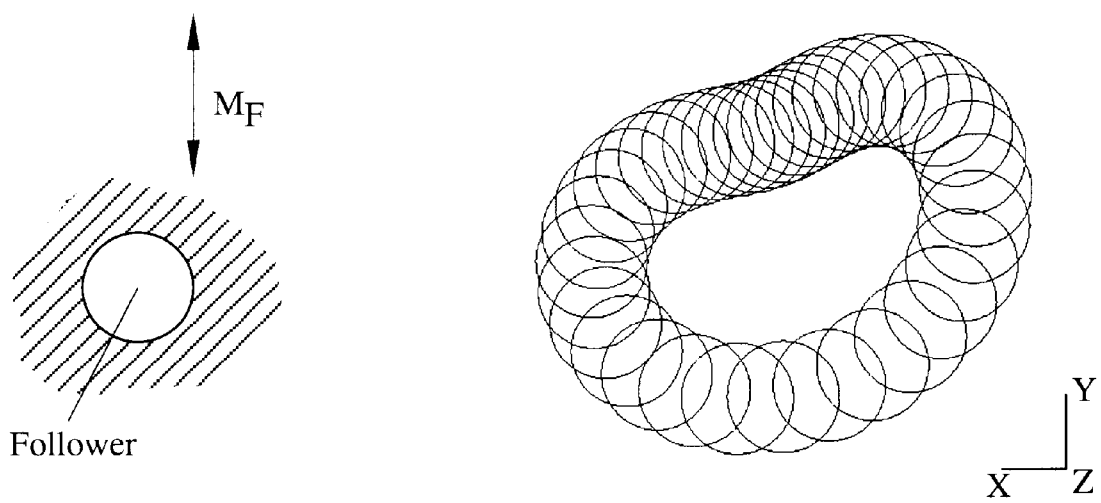
FIG. 35 is a schematic diagram of a cam follower having motion $M_F$ and the unsweep of the follower's shape in accordance with $M_F$.
Figure 36:
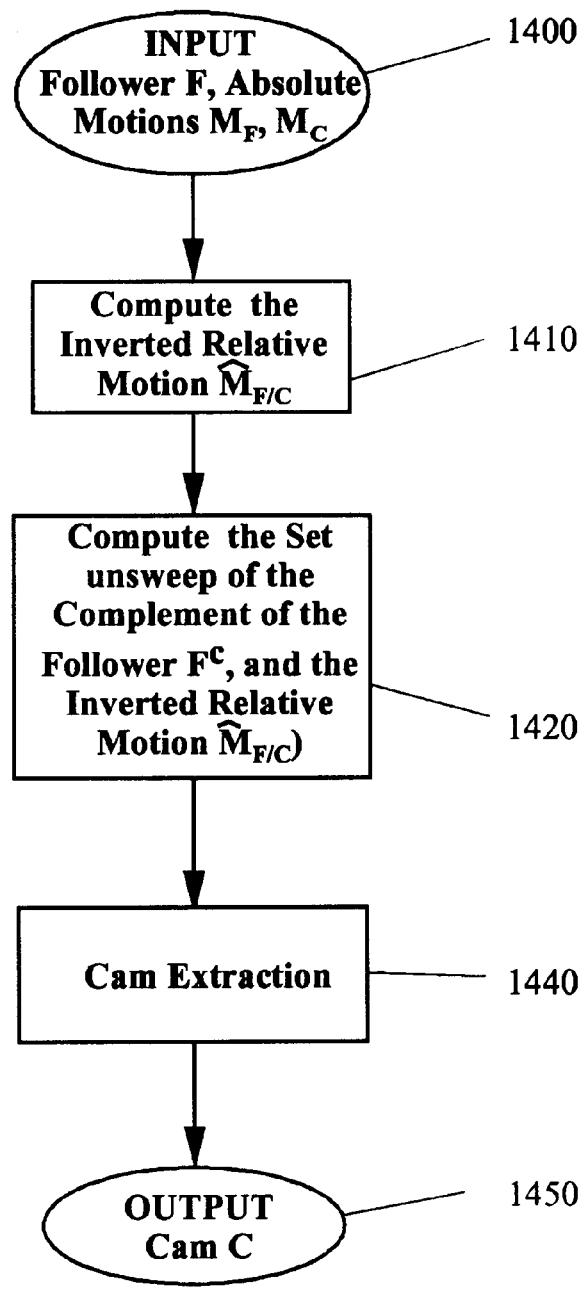
FIG. 36 is a flow diagram of the use of the unsweep operation to design cams.

To exemplify this application of the unsweep operation, FIG. 35 shows a situation where a planar cam has to move a circular follower F according to a prescribed motion $M_F$. The shape of the follower and the two absolute motions of the cam and follower (the rotation $M_c$ and translation $M_F$) may be used in the unsweep operation, e.g., the operation illustrated in FIG. 14, to determine the shape of the cam necessary to move the follower according to $M_F$. FIG. 36 recasts the flow diagram of FIG. 14 to specifically reflect this example, and the steps of FIG. 36 can be applied to all planar cams moving arbitrary followers.

Figure 37:
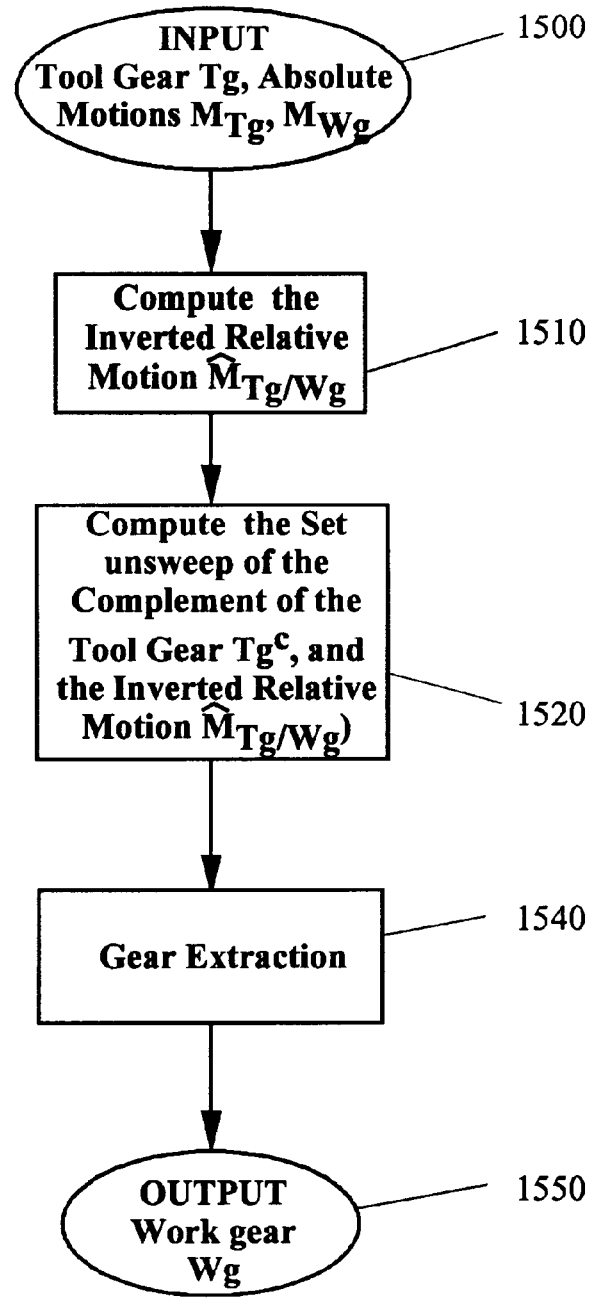
FIG. 37 is a flow diagram of the use of the unsweep operation to design gears.

Gear meshing is another example of conjugate motion where the unsweep operation has high utility. If the shape of one gear and the relative motion between the gears are defined, the unsweep operation can be used to precisely define the shape of the largest gear meshing with the first gear and operating according to the defined motion. FIG. 37 recasts the flow diagram of FIG. 14 to reflect this example. To fully appreciate the impact of unsweep in the art of gear design, note that the unsweep operation makes the design of non-cylindrical gears a routine matter, whereas design efforts in this area have heretofore been particularly difficult and time-consuming.

It should be appreciated that conjugate motion is just a particular case of objects moving in relative motion to which the unsweep procedure can be applied. The unsweep operation can be applied to a wide variety of other relative motion situations, e.g., dynamic collision detection of arbitrary objects in general relative motion. In this case, unsweep can reveal not only if the objects collide, but also the time when this happens. Moreover, in the case of colliding objects, the current invention provides a means of modifying the shape of the objects in order to maintain collision-free motion.

Application of Unsweep: General Parts Manufacturing

The unsweep operation can be useful in other phases of parts design and manufacturing apart from those noted above, for example, in quality control of manufactured parts. Many modern parts production lines include checks of finished parts via imaging the parts and then checking the image (i.e., its points) to see if the part shape meets desired criteria. This inquiry generally asks whether the part meets an acceptable part shape S. By use of the unsweep operation, the checking process can ask not whether the part meets an idealized shape S, but can instead ask the more direct question of whether the part has a shape that works (i.e., a shape that will allow operation without interference). It is then a simple matter to have appropriately configured software and/or firmware accept the part, reject it, or recommend modifications. This allows acceptance of parts that may for some reason have nonstandard shapes, but which nevertheless work for their intended purpose.

By this example, it should be understood that the defining means by which users may define the shape S and/or the envelope E need not incorporate manual input devices (i.e., keyboards whereupon users input predefined shapes/envelopes), but can instead be fully automated. The shape input for the unsweep operation can be defined manually and/or via a variety of shape sensors, e.g., optical, electromagnetic, pneumatic, or ultrasonic sensors which can be used to sense dimensions and thereby define input shapes. Motions can also be manually defined or can be automatically discerned by sensors monitoring time-varying position data.

Similarly, it is within the scope of the invention to automatically implement the output of the unsweep operation in parts production lines by directly supplying shape production or modification data to machining equipment, thereby having the machining equipment perform parts production or modification without the need for human oversight. This is relatively easy to implement because most modern parts production lines use computer-controlled machining equipment; see, e.g., U.S. Pat. No. 5,351,196 to Sowar et al. for an example of the use of the output of shape modeling programs in numerically controlled machining equipment.

Application of Unsweep: Computer Graphics and General Geometric Modeling

Another significant application of the unsweep operation is in computer aided design (CAD) systems. In analogy to the applications described above, the unsweep operation could, for example, be used to draw or otherwise define on a computer screen the boundaries within which parts must be designed. The unsweep operation could significantly speed up design processes because the design of machine parts is largely dictated by the functions that they are intended to perform, i.e., their motion. By simply inputting an envelope wherein parts must operate and then inputting the part motions, the direct result of the unsweep operation is proposed parts designs representing the "best fit" parts. If desired, the user could then reduce the size of the parts by redesigning them within the boundaries set by the proposed designs.

Figure 38:
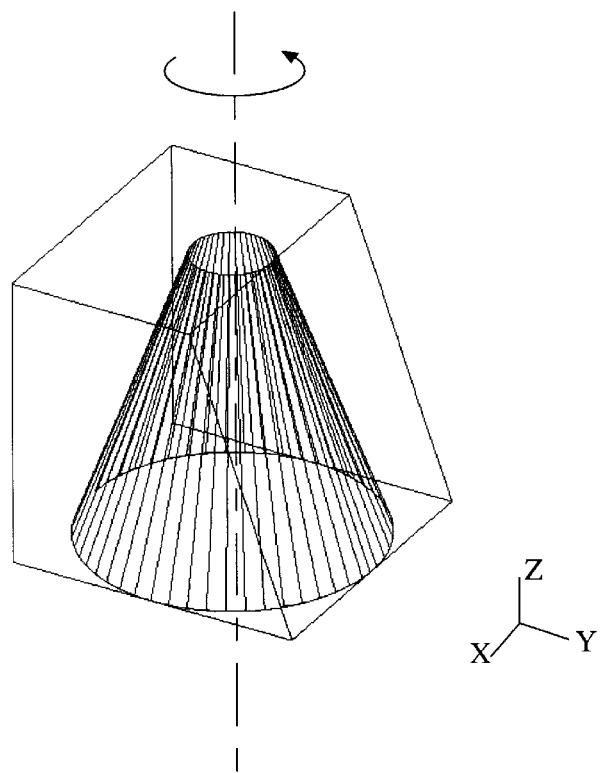
FIG. 38 is an orthogonal view of the unsweep of the prismatic solid S in accordance with a 360° rotation.

However, the unsweep operation need not be applied to shapes which correspond to actual or proposed real-world objects, and could be used, for example, in computer graphics and geometric modeling to synthesize shapes with desired aesthetic and mathematical properties. As an example, starting with some defined geometric object S, the user (or the system) could specify some hypothetical (virtual) motion M that may or may not have physical significance. The motion does not only have to be rigid (i.e., it need not take into account only the translation and/or rotation of a rigid shape), but may include deformation of the shape in space and/or time, as well as scaling, perspective, visibility and other properties. By computing unsweep(S,M), a new shape will be generated that inherits and combines the properties of S and M. For example, unsweep(plane, 360 degrees rotation) would produce an infinite cylinder; unsweep of this cylinder by another rotation can produce a sphere; and so on. FIG. 38 shows an example where unsweep of the prismatic solid S by a 360 degrees rotation produces a trimmed conus. More complex objects and motions will produce increasingly complicated and interesting results.

It is understood that preferred embodiments of the invention have been described above in order to illustrate how to make and use the invention. The invention is not intended to be limited to these embodiments, but rather is intended to be limited only by the claims set out below. Thus, the invention encompasses all alternate embodiments that fall literally or equivalently within the scope of these claims. It is understood that in the claims, means plus function clauses are intended to encompass the structures described above as performing their recited function, and also both structural equivalents and equivalent structures. As an example, though a nail and a screw may not be structural equivalents insofar as a nail employs a cylindrical surface to secure parts together whereas a screw employs a helical surface, in the context of fastening parts, a nail and a screw are equivalent structures.

Bibliography

1. Blackmore and M. C. Leu. A differential equation approach to swept volumes. *Proceedings of the 2nd International Conference on Computer Integrated Manufacturing*, pages 143–149, 1990.
2. Chen and C. H. Hoffmann. Towards feature attachment. Technical Report CSD-TR-94-010, *Department of Computer Science*, Purdue University, West Lafayette, Ind., February 1994.
3. J. K Davidson and K. H. Hunt. Robot workspace of a tool plane: Part 1—a ruled surface and other geometry. *Journal of Mechanisms, Transmissions and Automation in Design*, 109:50–60, 1987.
4. Evans, R. C. Koppelman and V. T. Rajan. Shaping geometric objects by cumulative translational sweeps. IBM *J. Res. Develop.*, 31(3):343–360, 1987.
5. D. Foley, A. van Dam, S. K. Feiner, and J. F. Hughes. *Computer Graphics: Principles and Practice*. Addison-Wesley, 1990.
6. A. Ganter. *Dynamic Collision Detection Using Kinematics and Solid Modeling Techniques*. PhD thesis, University of Wisconsin-Madison, 1985.
7. K. C. Hui. Solid modelling with sweep-CSG representation. *Proceedings of CSG 94 Set Theoretic Solid Modelling; Techniques and Applications*, pages 119–131, 1994.
8. Ilies and V. Shapiro. An approach to systematic part design. In *Proceedings of the 5th IFIP WG5.2 Workshop on Geometric Modeling in CAD*, pages 383–392, may 1996.
9. Kuratowski and A. Mostowski. Set Theory. North Holland, Amsterdam/New York/Oxford, 1976. Studies in Logic and Foundations of Mathematics, Vol. 86.
10. Jean-Claude Latombe. *Robot Motion Planning*. Kluwer Academic Publishers, Boston/Dordrecht/London, 1991.
11. R. Martin and P. C. Stephenson. Putting objects into boxes. *Computer Aided Design*, 20(9):506–514, 1988.
12. Martin and P. C. Stephenson. Sweeping of three dimensional objects. *Computer Aided Design*, 22(4):223–233, 1990.
13. Menon, R. J. Marisa, and J. Zagajac. More powerful solid modeling through ray representations. *IEEE Computer Graphics and Applications*, 14(3), May 1994.
14. Jai P. Menon and Dean M. Robinson. Advanced NC verification via massively parallel raycasting. *Manufacturing Review*, 6(2):141–154, 1993.
15. Menon and H. B. Voelcker. Set theoretic properties of ray representations and Minkowski operations on solids. *Technical Report* CPA91-9, Cornell Programmable Automation, Cornell University, Ithaca, N.Y., January 1992.
16. Requicha. Representations for rigid solids: Theory, methods and systems. *Computing Surveys*, 12(4):437–463, 1980.
17. Jean Serra. *Image Analysis and Mathematical Morphology*. Academic Press, London, 1982. Volume 1.
18. John M. Snyder and James T. Kajiya. Generative modeling: A symbolic system for geometric modeling. In *Computer Graphics (SIGGRAPH '92 Proceedings)*, volume 26, pages 369–378, 1992.
19. Sourin and A. Pasko. Function representation for sweeping by a moving solid. In Third International *Symposium on Solid Modeling and Applications*, pages 383–392, May 1995.
20. Spyridi. *Automatic Generation of High Level Inspection Plans for Coordinate Measuring Machine*. PhD thesis, University of Southern California, 1994.
21. B. Tilove. Set membership classification: A unified approach to geometric intersection problems. *IEEE Transactions on Computer*, C-29(10):874–883, October 1980.
22. L. Vossler. Sweep-to-CSG conversion using pattern recognition techniques. *IEEE Computer Graphics and Applications*, 5(8):61–68, 1985.
23. Wang and K. K. Wang. Geometric modeling for swept volume of moving solids. *IEEE Computer Graphics Applications*, pages 8–17, December 1987.

APPENDIX A

```
-- ************************************************************************
-- This computer program is one implementation of the invention. The program computes
-- the unsweep of an object that moves according to a given motion. The actual
-- computation uses an octree decomposition of the space. The motion is a translation
-- along a curve given by points, transformed into a B-spline curve and loaded from a file
-- indicated below. The body is also loaded from a file as well. The geometry engine
-- used is Parasolid (Electronic Data Systems, Cypress, CA, USA), and the program is
-- run within the KID (LISP) interface of Parasolid. This program runs on both UNIX
-- and NT platforms. The cells are classified into three categories: fully belong, partially
-- belong, or do not belong to the unsweep. Due to memory usage considerations, those
-- that fully belong to the unsweep are saved in a file for post-processing into a data
-- structure having the desired form. With reference to FIGS. 13–15, Step 110 is
-- represented by the octree decomposition. Step 120 is represented by the trajectory test
-- performed for each cell. Step 130 is a test of the size of the current cell against the cell
-- of the minimum size. Step 140 consists of saving the cell coordinates in a file and
-- uniting all cells. The union of all cells is done by calling a different function which is
-- separated from this program.
-- ************************************************************************
-- Starts the modeller
     (modeller start) (messoff 3) (option timing 0) (option journal 0)
-- Loading the motion data from a file named "motion_data" and the object from a file
-- named "body_data". Load LISP functions used during computations. A short
-- description of each function can be found next to each particular function.
(load "c:\octree\motion_data")      (load "c:\octree\body_data")  (load
"c:\octree\form_vertex_list")     (load "c:\octree\inters_at_verts")  (load
"c:\octree\find_intersection") (load "c:\octree\octree")
-- "start_temp" and "end_temp" are temporary points used in trajectory generation for
-- different points.
     (setq start_temp start_point) (setq end_temp end_point)
     (setq minimum_size '5)        -- Minimum size of the octree cell
     (setq first_step 0)      -- skip the computations when recursing the first time
     (setq body_box (body0 box))         -- Set the enclosing box
-- Perturbed box to avoid round-off and other types of numerical errors. This enclosing
-- box will be further divided in octrees
(setq body_box (list (list (difference (caar body_box)) 1.07) (difference (cadr (car body_box))
1.07) (difference (caddr (car body_box)) 1.07)) (list (plus (caadr body_box) 1.07) plus (cadr
(cadr body_box)) 1.07) (plus (caddr (cadr body_box)) 1.07))))
-- Call to the function that recursively decomposes the enclosing box of the body in
-- octrees, performs the PMC on selected points of every cell processes the cells to
-- determine which one fully belongs to, partially belongs to, or does not belong to
-- unsweep.
     (build_octree body_box initial_curve_tag minimum_size) (modeller stop)
-- ************************************************************************
-- File name motion_data
-- This file contains data for the motion which is a translation along a B-spline curve
- generated below.
-- ************************************************************************
     (setq start_point '(-27.0 -20.0 -31.0)) (setq end_point '(10.0 30.0 31.0))
     (setq p1 '(20.0 -10.0 4.0)) (setq p2 '(10.0 -30.0 14.0))
     (setq point_list (list start_point p1 p2 end_point))
     (setq initial_curve_tag (crsppc point_list '(PAPRCU) '(PAPRKT 0.0 0.5 0.6 1.0)))
-- ************************************************************************
-- File name form_vertex_list
-- Forms the list of two extreme corners for each of the 8 children of the current cell. It
-- receives two extreme vertices of the current cell.
-- ************************************************************************
(defun form_octree_list (current_box)
(let ((xcorner1 (car (car current_box))) (ycorner1 (car (cdr (car current_box))))
     (zcorner1 (car (cdr (cdr (car current_box))))) (xcorner2 (car (car (cdr current_box))))
     (ycorner2 (car (cdr (car (cdr current_box))))) (zcorner2 (car (cdr (cdr (car (cdr
     current_box)))))))
     (list     (list xcorner1 ycorner1 zcorner1) (list xcorner2 ycorner1 zcorner1)
               (list xcorner2 ycorner2 zcorner1) (list xcorner1 ycorner2 zcorner1)
               (list xcorner1 ycorner1 zcorner2) (list xcorner2 ycorner1 zcorner2)
               (list xcorner2 ycorner2 zcorner2) (list xcorner1 ycorner2 zcorner2))))
-- ************************************************************************
-- File name inters_at-verts
-- This function organizes the intersection between the given trajectory and the faces of
-- the current cell. Arguments passed to this function are the tag of the curve and the list
-- of 8 vertices of the current cell.
-- ************************************************************************
(defun inters_at_verts (current_curve_tag current_vertex_list)
 (loop (while (not (null current_vertex_list)))
-- Temporarily creates a curve and moves it to the next vertex in the list
     (setq temp_curve_tag (copyen initial_curve_tag))
     (move_curve temp_curve_tag (car current_vertex_list))
-- Modifies the list of vertices
     (setq current_vertex_list (cdr current_vertex_list))
     (let ((curve_answer 'undefined) (c_intersection_flag 'out))
```

APPENDIX A-continued

```
-- Calls the function that intersects the temporary curve placed at one vertex with ALL the
-- faces of the current cell
      (intersect_curve_faces (body0 faces) temp_curve_tag start_temp end_temp)
-- Forms the answer of the intersection for the current octree
      (setq octree_answer (list octree_answer (check_answer curve_answer)))
      (delent temp_curve_tag))))
-- ************************************************************************
-- This function recursively intersects the temporary curve placed at one vertex with ALL
-- the faces of the current cell. As arguments it receives a list of faces of the object, the
-- tag of the curve to be intersected with the faces and the two end-points of the curve
-- (needed by the Parasolid routine used).
-- ************************************************************************
(defun intersect_curve_faces (face_list curve_tag point1 point2)
 (cond ((not (null face_list)) (get_intersection_point (incufa curve_tag point1 point2 (car
face_list))) (intersect_curve_faces (cdr face_list) curve_tag point1 point2)) (t nil)))
-- ************************************************************************
-- Forms a simple answer ("in" or "out") for the intersection between the current curve
-- and the faces of the current cell. The argument passed is a list of "in"'s and/or "out"'s,
-- one for each face of the cell. If all are "in", then the curve does not intersect the faces,
-- else it does.
-- ************************************************************************
(defun check_answer (curve_answer)
 (cond -- Encounter something else than an "in"
  ((and (not (equal curve_answer 'undefined)) (not (equal (cadr curve_answer) 'in)))
  (setq c_intersection_flag 'out))
-- Base case
  ((equal curve_answer 'undefined) (setq c_intersection_flag 'in))
-- Recursive case, check that the list of intersections contains ins.
  (t (check_answer (car curve_answer)))))
-- ************************************************************************
-- Moves a curve to a specified point. It receives as arguments the tag of the curve, and
-- the target point. It also sets the temporary end-points to their correct values.
-- ************************************************************************
(defun move_curve (given_curve_tag given_point)
(let ( (xdir (plus (car given_point) (minus (car start_point))))
      (ydir (plus (car (cdr given_point)) (minus (car (cdr start_point)))))
      (zdir (plus (car (cdr (cdr given_point))) (minus (car (cdr (cdr start_point)))))))
(let* ((size_dir (sqrt (plus (plus (times xdir xdir) (times ydir ydir)) (times zdir zdir))))
  (direction_curve
      (list (divide xdir size_dir) (divide ydir size_dir)(divide zdir size_dir))))
      (setq translate_tag (cretra direction_curve size_dir))
      (setq start_temp (list (plus (car start_point) xdir) (plus (car (cdr start_point)) ydir)
       (plus (car (cdr (cdr start_point))) zdir)))
      (setq end_temp (list (plus (car end_point) xdir) (plus (car (cdr end_point)) ydir)
       (plus (car (cdr (cdr end_point))) zdir)))))
(apptra given_curve_tag translate_tag) (delent translate_tag))
-- ************************************************************************
-- File name find_intersection
-- This function can extract the information of the intersection points, if any.
-- ************************************************************************
(defun get_intersection_point (answer)
 (cond ((and (null answer) (equal (body0 clash start_temp) 'in)) (setq curve_answer_temp
      'in)) (t (setq curve_answer_temp 'out)))
 (setq curve_answer (list curve_answer curve_answer_temp)))
-- ************************************************************************
-- File name octree
-- This function builds the octree. The parameters that are passed to the function are the
-- box of the parent cell, the trajectory of the translation and the minimum size of the
-- octree where the computations should stop..
-- ************************************************************************
(defun build_octree (given_box given_curve_tag minimum_size) (princ'.)
-- Step 130 of FIG. 14: tests if current cell greater than the minimum size
 (cond ((and (greaterp (abs (difference (caar given_box)    (car (cadr given_box))))
minimum_size) (greaterp (abs (difference (cadar given_box)    (car (cdadr given_box))))
minimum_size) (greaterp (abs (difference (car (cddar given_box)) (cadr (cdadr given_box))))
minimum_size)) (setq octree_answer 'first)
-- Forms the list of vertices for the current cell.
 (let ((octree_v_list (form_octree_list given_box)))
   (cond ((equal first_step 1)
-- ** Step 120 of FIG. 14: if it is not the first step, it calls a function that performs the
-- intersection of the trajectory with the faces of the cells
      (inters_at_verts given_curve_tag octree_v_list)
-- Checks if the cell is completely "in," in which case sets a flag to the value "in"
      (check_octree_answer octree_answer)) (t (setq intersection_flag 'partial)))
-- Tests if the flag is "in", in which case saves the two extreme coordinates of the cell..
  (cond            -- ** Step 140 of FIG. 14
   ((equal intersection_flag 'in)
      (setq u_handle (open "c:\octree\Uns5_NT_ribbon" "a"))
      (write u_handle given_box) (close u_handle) (print 'in))
```

APPENDIX A-continued

```
((and (equal intersection_flag 'out) (not (equal first_step 0)) nil)) (t (setq first_step 1)
-- ** Step 110 of FIG. 14: recursively forms the octrees
    (let*   ((octree_boxes (get_octree_boxes   octree_v_list)))   (build_octree (car
octree_boxes)   given_curve_tag   minimum_size)   (build_octree   (cadr   octree_boxes)
given_curve_tag minimum_size) (build_octree (caddr octree_boxes) given_curve_tag
minimum_size) (build_octree (cadr (cddr octree_boxes)) given_curve_tag minimum_size)
(build_octree (caddr (cddr octree_boxes)) given_curve_tag minimum_size) (build_octree
(cadr (cddr (cddr octree_boxes))) given_curve_tag minimum_size) (build_octree (caddr
(cddr (cddr octree_boxes))) given_curve_tag minimum_size) (build_octree (cadr (cddr
(cddr octree_boxes)))) given_curve_tag minimum_size)))))) (t nil)))
-- ***********************************************************************
-- Separates the list of corners for the 8 octree children from the list of ALL vertices of
-- the given box. The argument passed to this function is the list of the 8 vertices of the
-- current cell. It returns one single list of two extreme vertices corresponding to each of
-- the 8 children of the current cell.
-- ***********************************************************************
(defun get_octree_boxes (current_v_list)
  (let ( (vertex_min (car current_v_list)) (vertex_max (car (cdr (cdr (cdr (cdr (cdr (cdr
current_v_list))))))))
    (let* ((xv_med (plus (car vertex_min)   (divide (difference (car vertex_max) (car
vertex_min)) 2))) (yv_med (plus (cadr vertex_min) (divide (difference (cadr vertex_max)
(cadr vertex_min)) 2))) (zv_med (plus (caddr vertex_min) (divide (difference (caddr
vertex_max) (caddr vertex_min)) 2))))
      (list (list (list (car vertex_min) (cadr vertex_min) (caddr vertex_min)) (list xv_med
yv_med zv_med)) (list (list xv_med (cadr vertex_min) (caddr vertex_min)) (list (car
vertex_max) yv_med zv_med)) (list (list xv_med yv_med (caddr vertex_min)) (list (car
vertex_max) (cadr vertex_max) zv_med))   (list (list (car vertex_min) yv_med (caddr
vertex_min)) (list xv_med (cadr vertex_max) zv_med)) (list (list (car vertex_min) (cadr
vertex_min) zv_med) (list xv_med yv_med (caddr vertex_max))) (list (list xv_med (cadr
vertex_min) zv_med) (list (car vertex_max) yv_med (caddr vertex_max)))
      (list (list xv_med yv_med zv_med) (list (car vertex_max) (cadr vertex_max) (caddr
vertex_max))) (list (list (car vertex_min) yv_med zv_med) (list xv_med (cadr vertex_max)
(caddr vertex_max)))))))
-- ***********************************************************************
-- Forms the answer of the intersection between the trajectory and
-- all faces of the current cell: it can be "in", "out" or "partial".
-- ***********************************************************************
(defun check_octree_answer (octree_answer)
  (cond ((equal octree_answer '((((((((first out) out) out) out) out) out) out) out))
    (setq intersection_flag 'out))
    ((equal octree_answer '((((((((first in) in) in) in) in) in) in) in))
    (setq intersection_flag 'in)) (t (setq intersection_flag 'partial))))
-- ***********************************************************************
-- File name show_unsweep
-- This file contains the post-processing code. It corresponds to Step 140 from FIG. 14.
-- This code reads the coordinates of the cells that belong to the unsweep (which were
-- saved in a file by the main program) and generates the unsweep as a 3-dimensional
-- solid. It also saves the solid in a file. The geometry engine used is Parasolid
-- (Electronic Data Systems, Cypress, CA) and the program is run within the KID (LISP)
-- interface of Parasolid. This program runs on both UNIX and NT platforms.
-- ***********************************************************************
-- Starts the modeler and sets the correct options
    (modeller start) (option general_topology 1)
-- This function transforms each cell (octree) into a 3-dimensional cube
(defun create_body (given_v_list curr_body)
(setq vertex_min (car given_v_list)) (setq vertex_max (car (cdr given_v_list))) (setq bxsize
(difference (car vertex_max) (car vertex_min))) (setq bysize (difference (cadr vertex_max)
(cadr vertex_min))) (setq bzsize (difference (caddr vertex_max) (caddr vertex_min))) (setq
base_point (list (plus (car vertex_min) (divide bxsize 2)) (plus (cadr vertex_min) (divide
bysize 2))(caddr vertex_min)))
  (curr_body x bxsize; y bysize; z bzsize; point base_point;direction '(0 0 1);create))
-- Main program: opens the data file, reads coordinates of the first cell and starts the
-- loop that generates the unsweep -- solid
    (setq u_handle (open "c:\octree\Uns5_NT_ribbon" 'r)) (define uns p_block) (setq
uns_list (read u_handle)) (create_body uns_list uns) (close u_handle) (setq u_handle (open
"c:\octree\Uns5_NT_ribbon" 'r))
(loop (while (not (eof u_handle))) (setq cube_list (read u_handle))
    (define cube p_block) (create_body cube_list cube)
    (bopbys (uns tag) (cube tag) '(boopun)) (undefine cube))
-- Saves the unsweep in a file and closes the data file
    (uns transmit "c:\octree\Uns5_NT_ribbon") (close u_handle)
    (modeller stop)         -- Stops the modeller
```

APPENDIX B

```
-- **********************************************************************
-- This program computes the largest set that remains inside a specified object while the
-- object moves according to a specified motion. It uses the definition of the unsweep
-- in terms of an infinite intersection and approximates the unsweep by a finite intersection.
-- It also displays both object and set unsweep(S,M). In this program both the object and
-- the motion are defined. It can be easily modified such that it would read the object
-- and the 4 x 4 matrix representing the motion from files. The object and motion defined
-- in this program were used to generate FIG. 29. This program is run within the KID
-- interface of the Parasolid solid modeller (EDS Unigraphics, Cypress, CA, USA).
-- **********************************************************************
    (modeller start)              -- Start the modeller
-- **********************************************************************
-- Step 1800 in FIG 18: Input Inverted Motion M and Set S
-- **********************************************************************
-- Parameters of the motion: The motion is a rotation around the axis (0 0 1) with an
-- angle of 1 radian.
    (setq ang '1)                              -- angle of rotation in rads
    (setq instances '10)                       -- instances of rotation
    (setq pas (divide (minus ang) instances))  -- step of rotation for each instance
    (setq i '0)                                -- loop variable
    (setq orrigin '(44.2 74 0))                -- center of the hole/axis of rotation
    (setq dir '(0 0 1))          -- direction perpendicular to the plane of the part
-- Define the object
    (define b0 p_cylinder)
    (b0 point '(44.2 0 44.2); direction '(0 1 0); height 88.4; radius 44.8; create)
-- Define the hole around which the cylinder will rotate. (This is used only for visually
-- indicating the axis of rotation of the drawing.)
    ((define c0 p_cylinder) radius 5; height 100; point origin; direction '(0 0 1);create)
-- Two replicas object of the initial object used in computation
    (define bin p_cylinder) (bin replicate 'b0)
    (define b1 p_cylinder) (b1 replicate 'b0)
-- Define the inverted motion
    ((define t0 p_rotation) point orrigin;direction dir;angle pas;create)
-- **********************************************************************
-- Steps 1810 through 1840 in FIG. 18: Apply inverted motion to S (1810), intersect
-- (1820), test termination condition (1830), and keep cells that belong to the unsweep
-- (1840).
-- **********************************************************************
-- Main loop
    (loop
      (while (lessp i instances))
      (t0 apply 'b1) (b1 intersect 'b0) (b0 replicate 'bin)(setq i (plus i 1)))
-- Subtract the hole from the object to illustrate the axis of rotation
    (b1 subtract c0)
-- **********************************************************************
-- Step 1850 of FIG. 18: output/display unsweep (S,M)
-- **********************************************************************
-- Optionally, save the objects in files. The lines are currently commented.
--    (b1 transmit "b1") (b0 transmit "b0")
-- Display the objects.
    (graphics open_device 'xwindow)
    (graphics hidden 'b0; ar)
    (graphics hidden 'b1;ar)
--  (graphics postscript "cyl.ps")
    (modeller stop)              -- Stop the modeller
```

What is claimed is:

1. A method for shaping a geometric model of an object having initially undefined shape comprising the steps of:
   a. defining a motion M of the object,
   b. defining an envelope E wherein the object moves with motion M, the envelope E being defined by a set of points; and
   c. unsweeping envelope E in accordance with motion M, thereby defining a shape S equal to the largest subset of points fitting within E at all times during motion M.

2. The method of claim 1 wherein the step of unsweeping envelope E comprises the steps of:
   a. defining multiple cells within envelope E, each cell containing one or more points,
   b. defining shape S as all cells remaining within envelope E as each cell moves in accordance with motion M.

3. The method of claim 1 wherein the step of unsweeping envelope E comprises the step of determining the intersection of the points within E and the points within E moving according to the inverse of motion M.

4. The method of claim 3 wherein the step of determining the intersection is performed by intersecting the points within E at discrete time intervals.

5. The method of claim 1 further comprising the step of determining the complement of shape S, thereby defining the sweep of the complement of envelope E moving in accordance with the inverse of motion M.

6. The method of claim 1 wherein envelope E represents an enclosure having defined shape wherein a part must move, the part having initially undefined shape less than or equal to the shape S, and further wherein motion M represents the relative motion of the part with respect to the enclosure.

7. The method of claim 6 further comprising the step of designing the part within a space bounded by shape S.

8. The method of claim 1 wherein envelope E represents the complement of the shape of a part having defined shape, the part moving within an enclosure having initially undefined shape greater than or equal to the complement of shape S, and further wherein the motion M represents the inverse of the relative motion of the part with respect to the enclosure.

9. The method of claim 8 further comprising the step of designing the enclosure to contain a space bounded by the complement of S.

10. The method of claim 1 wherein envelope E represents the complement of the shape of a first part having a defined shape and motion M represents the conjugate motion of a second part with respect to the first part, the second part having initially undefined shape less than or equal to shape S.

11. The method of claim 10 further comprising the step of designing a second part within the space bounded by shape S.

12. The method of claim 1 wherein motion M includes at least one of a rotation, a translation, a deformation, scaling, and perspective.

13. An apparatus for shaping a geometric model of an object having initially undefined shape comprising:
   a. motion defining means for defining a motion M;
   b. envelope defining means for defining an envelope E wherein the motion M occurs, and
   c. calculating means for determining the largest shape S that fits within E at all times during motion M.

14. The apparatus of claim 13 further comprising:
   a. part defining means for defining the shape of a part, and
   b. comparison means for comparing the shape of the part to shape S.

15. A method for shaping a part having initially undefined shape comprising the steps of:
   a. defining an envelope E wherein the part moves;
   b. defining the part motion M relative to envelope E,
   c. unsweeping envelope E in accordance with motion M, thereby defining the largest space S wherein the part may exist without interfering with envelope E.

16. The method of claim 15 wherein the step of unsweeping envelope E includes the step of determining the intersection of all points within E as E moves according to the inverse of motion M.

17. The method of claim 16 wherein the step of determining the intersection is performed by intersecting points within E at discrete time intervals.

18. The method of claim 15 wherein the step of unsweeping envelope E includes the steps of:
   a. defining multiple cells whethin envelope E, and
   b. determining whether each cell remains within envelope E as each cell moves in accordance with motion M.

19. The method of claim 15 wherein envelope E represents the complement of the shape of a second part and motion M represents the conjugate motion of shape S with respect to envelope E.

20. The method of claim 15 further comprising the steps of:
   a. proposing a part shape; and
   b. subtracting the unsweep of envelope E from the proposed part shape, thereby defining any portions of the proposed part shape that interfere with envelope E.

21. A method for shaping a geometric model of an object having initially undefined shape comprising the steps of:
   a. defining a motion M of the object,
   b. defining an envelope E wherein the object moves with motion M, the envelope E being defined by a set of points;
   c. sweeping the complement of the envelope E in accordance with the inverse of motion M; and
   d. taking the complement of the sweep to obtain a shape S equal to the largest subset of points fitting within E at all times during motion M.

22. The method of claim 21 wherein envelope E represents an enclosure having defined shape wherein a part must move, the part having initially undefined shape less than or equal to the shape S, and further wherein motion M represents the relative motion of the part with respect to the enclosure.

23. The method of claim 22 further comprising the step of designing the part within a space bounded by shape S.

24. The method of claim 21 wherein envelope E represents the complement of the shape of a part having defined shape, the part moving within an enclosure having initially undefined shape greater than or equal to the complement of shape S, and further wherein the motion M represents the inverse of the relative motion of the part with respect to the enclosure.

25. The method of claim 24 further comprising the step of designing the enclosure to contain a space bounded by the complement of S.

26. The method of claim 21 wherein envelope E represents the complement of the shape of a first part having a defined shape and motion M represents the conjugate motion of a second part with respect to the first part, the second part having initially undefined shape less than or equal to shape S.

27. The method of claim 26 further comprising the step of designing a second part within the space bounded by shape S.

28. The method of claim 21 wherein motion M includes at least one of a rotation, a translation, a deformation, scaling, and perspective.

* * * * *